（12) United States Patent
Rymkowski et al.

(10) Patent No.: US 10,789,694 B1
(45) Date of Patent: Sep. 29, 2020

(54) REAL-TIME ADJUSTMENT OF TEMPORAL CONSISTENCY CONSTRAINTS FOR VIDEO STYLE

(71) Applicant: Apple Inc., Cupertino, CA (US)

(72) Inventors: Bartlomiej W. Rymkowski, San Jose, CA (US); Francesco Rossi, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 244 days.

(21) Appl. No.: 16/032,938

(22) Filed: Jul. 11, 2018

Related U.S. Application Data

(60) Provisional application No. 62/557,053, filed on Sep. 11, 2017.

(51) Int. Cl.
*G06K 9/62* (2006.01)
*G06T 5/50* (2006.01)
(Continued)

(52) U.S. Cl.
CPC ............. *G06T 5/50* (2013.01); *G06N 3/0454* (2013.01); *G06T 7/251* (2017.01); *G06T 2207/20221* (2013.01)

(58) Field of Classification Search
CPC ...... G06K 9/46; G06K 9/6256; G06K 9/6201; G06T 3/4046; G06T 2207/20081;
(Continued)

(56) References Cited

U.S. PATENT DOCUMENTS 6,011,536 A    1/2000   Hertzmann
6,973,130 B1  12/2005   Wee et al.
(Continued)

FOREIGN PATENT DOCUMENTS

CN          106327448 A      1/2017
WO         2017021322 A1     2/2017

OTHER PUBLICATIONS

"Will photo art phenom Prisma raise or get bought?" TechCrunch, Retrieved from the Internet: URL: https://techcrunch.com/2016/07/19/prismagram/ [Retrieved on Jul. 20, 2016].
(Continued)

*Primary Examiner* — Samir A Ahmed
(74) *Attorney, Agent, or Firm* — Blank Rome LLP

(57) ABSTRACT

Artistic styles extracted from one or more source images may be applied to one or more target images, e.g., in the form of stylized images and/or stylized video sequences. The extracted artistic style may be stored as a plurality of layers in a neural network, which neural network may be further optimized, e.g., via the fusion of various elements of the network's architectures. An optimized network architecture may be determined for each processing environment in which the network will be applied. The artistic style may be applied to the obtained images and/or video sequence of images using various optimization methods, such as the use of scalars to control the resolution of the unstylized and stylized images, temporal consistency constraints, as well as the use of dynamically adjustable or selectable versions of Deep Neural Networks (DNN) that are responsive to system performance parameters, such as available processing resources and thermal capacity.

20 Claims, 21 Drawing Sheets

(51) Int. Cl.
*G06N 3/04* (2006.01)
*G06T 7/246* (2017.01)

(58) Field of Classification Search
CPC . G06T 5/50; G06T 7/251; G06T 2207/20221; G06N 3/08; G06N 3/0454
See application file for complete search history.

(56) References Cited

U.S. PATENT DOCUMENTS

| | | | |
|---|---|---|---|
| 7,933,454 | B2 | 4/2011 | Bressan |
| 8,160,396 | B2 | 4/2012 | Brand |
| 8,189,920 | B2 | 5/2012 | Tomizawa |
| 8,355,592 | B1 | 1/2013 | Shechtman |
| 8,896,622 | B2 | 11/2014 | Winnemoeller |
| 9,036,898 | B1 | 5/2015 | Beeler |
| 9,105,117 | B2 | 8/2015 | Asente |
| 9,135,732 | B2 | 9/2015 | Winn |
| 9,208,539 | B2 | 12/2015 | Choudhury |
| 9,536,293 | B2 | 1/2017 | Lin |
| 9,552,510 | B2 | 1/2017 | Li |
| 9,594,977 | B2 | 3/2017 | Lin |
| 9,665,930 | B1 | 5/2017 | Bedi |
| 9,799,099 | B2 | 10/2017 | Yang |
| 10,565,757 | B2 | 2/2020 | Oxholm |
| 2009/0185747 | A1 | 7/2009 | Segall et al. |
| 2011/0081093 | A1 | 4/2011 | Racape et al. |
| 2011/0115815 | A1 | 5/2011 | Xu |
| 2014/0241592 | A1 | 8/2014 | Yang |
| 2015/0224395 | A1 | 8/2015 | Trombetta et al. |
| 2015/0339570 | A1 | 11/2015 | Scheffler |
| 2015/0371447 | A1 | 12/2015 | Yasutake |
| 2016/0034788 | A1 | 2/2016 | Lin |
| 2016/0225164 | A1 | 8/2016 | Tomlin et al. |
| 2017/0139572 | A1 | 5/2017 | Sunkavalli |
| 2017/0140253 | A1 | 5/2017 | Wshah |
| 2017/0213112 | A1 | 7/2017 | Sachs |
| 2017/0220854 | A1 | 8/2017 | Yang |
| 2018/0082407 | A1 | 3/2018 | Rymkowski |
| 2018/0082715 | A1 | 3/2018 | Rymkowski |
| 2018/0240257 | A1* | 8/2018 | Li .................. G06T 11/001 |
| 2018/0373999 | A1* | 12/2018 | Xu .................. G06N 3/0454 |
| 2019/0213444 | A1* | 7/2019 | Zheng ............. G06T 11/60 |
| 2019/0220746 | A1* | 7/2019 | Liu .................. G06K 9/6262 |

OTHER PUBLICATIONS

Azad, et al., "Bangladeshi Style: a Way of Facial Artistic Stylization in Visual Effects," 16th Int'l Conf. Computer and Information Technology, Mar. 8-10, 2014, Khulna, Bangladesh.

Gatys, et al., "Image Style Transfer Using Convolutional Neural Networks," IEEE Conference on Computer Vision and Pattern Recognition (CVPR), Jun. 27-30, 2016.

Gatys, Leon A., Alexander S. Ecker, and Matthias Bethge. "A neural algorithm of artistic style." arXiv preprint arXiv:1508.06576 (2015).

Huang, et al., "Real-Time Neural Style Transfer for Videos," IEEE Conference on Computer Vision and Pattern Recognition (CVPR), 2017, pp. 783-791.

Jing, et al., "Neural Style Transfer: A Review," arXiv:1705.04058v1, May 11, 2017.

Kwatra et al., "Texture Optimization for Example-based Synthesis," Association for Computing Machinery, Inc., 2005.

Li, Multimodal 2D+3D Facial Expression Recognition with Deep Fusion Convolutional Neural Network, IEEE Transactions on Multimedia, vol. PP, Issue: 99, 2017.

Novak, et al., "Improving the Neural Algorithm of Artistic Style," Ecole normale superieure de Cachan, Cachan, France, May 15, 2016.

Ruder, et al., "Artistic style transfer for videos," arXiv:1604.08610v2, Oct. 19, 2016.

Yan, et al., "Automatic Photo Adjustment Using Deep Neural Networks," ACM Transcations on Graphics, May 16, 2015.

* cited by examiner

REAL-TIME ADJUSTMENT OF TEMPORAL CONSISTENCY CONSTRAINTS FOR VIDEO STYLE

TECHNICAL FIELD

This disclosure relates generally to the field of digital image processing. More particularly, but not by way of limitation, it relates to techniques for applying computer vision and machine learning to artistic style transfers, as embodied in Deep Neural Networks (DNNs).

BACKGROUND

The advent of portable integrated computing devices has caused a wide proliferation of cameras and video devices. These integrated computing devices commonly take the form of smartphones or tablets and typically include general purpose computers, cameras, sophisticated user interfaces including touch sensitive screens, and wireless communications abilities through WiFi, Long Term Evolution (LTE), High Speed Downlink Packet Access (HSDPA) and other cell-based or wireless technologies (WiFi is a trademark of the Wi-Fi Alliance, LTE is a trademark of the European Telecommunications Standards Institute (ETSI)). The wide proliferation of these integrated devices provides opportunities to use the devices' capabilities to perform tasks that would otherwise require dedicated hardware and software. For example, as noted above, integrated devices such as smartphones and tablets typically have one or two embedded cameras. These cameras generally amount to lens/camera hardware modules that may be controlled through the general purpose computer using firmware and/or software (e.g., "Apps") and a user interface, e.g., including a touch-screen interface and/or touchless control, such as voice control.

The integration of cameras into communication devices such as smartphones and tablets has enabled people to share images and videos in ways never before possible. It is now very popular to acquire and immediately share images and/or videos with other people by either sending the photos via text message, by SMS, by email, though Apps, or by uploading the photos to an Internet-based website, such as a social networking site or a photo sharing site. User often desire to apply one or more corrective or artistic filters to their images and/or videos before sharing them with other users or posting them to Internet-based websites. Some such filters may modify the images in a content-independent fashion, e.g., a vignetting effect that darkens the outer borders of the image. Other filters may perform one or more color or brightness mapping techniques to improve the appearance of the image. Still other filters may manipulate each pixel in a programmatically-defined fashion to create a particular "effect," e.g., an antique image effect or a black and white effect.

However, more and more, users desire the ability to apply more complex artistic effects to their captured images and/or video that do not simply perform a mathematical mapping of each pixel value in the image to generate an output image, but instead use artificial intelligence to imbue the 'essence' of a particular artistic style to their captured images and/or video. One such approach for applying artistic styles to images has been proposed in Gatys et al., "A Neural Algorithm of Artistic Style," arXiv:1508.06576v2 [cs.cV], 2 Sep. 2015 (which paper is hereby incorporated by reference and referred to hereinafter as, "Gatys,") and provides a neural algorithm that separates and recombines the content and style of arbitrary images to synthesize artistic versions of the input images. However, the algorithm proposed in Gatys takes a significant amount of time to apply an artistic style to a single image, and also requires a substantial amount of processing power, which is not typically available on users' personal electronic devices.

Due to the substantial time and processing requirements imposed by the Gatys algorithm, the generation of stylized images or a stylized video sequence in real-time or even near real-time on portable electronic devices is not feasible, given the thermal and processing constraints faced by personal electronic devices. Moreover, a naïve application of the artistic style transfer techniques of Gatys to each image in a sequence of images results in an assembled video sequence that has an undesirable amount of random 'jitter' or 'flicker' around moving and non-moving objects in the images due, at least in part, to the stochastic nature of the style transfer process.

SUMMARY

Techniques are disclosed herein for applying an artistic style extracted from one or more source images, e.g., paintings, to one or more target images. The extracted artistic style may then be stored as a plurality of layers in a neural network. In some embodiments, two or more stylized target images may be combined and stored as a stylized video sequence. The artistic style may be applied to the target images in the stylized video sequence using various optimization methods, such as the use of scalars or filters to control the resolution of the unstylized and stylized images, as well as the use of dynamically adjustable or selectable DNNs that are responsive to system performance parameters. In other embodiments, temporal consistency constraints may be employed in a way that prevents excessive content pixel fluctuations between images and preserves smoothness in the assembled stylized video sequence.

Use of such optimization methods, adjustable/selectable DNNs, and/or temporal consistency constraints may enable the style transfer techniques disclosed herein to create high quality stylized video sequences in a far more efficient fashion than is currently possible. For example, the techniques disclosed herein may be utilized to: 1.) help maintain a consistent look across video frames (e.g., by minimizing flicker); 2.) avoid thermal and/or power constraint issues when a running high energy cost operation (e.g., style transfer for video) for long periods of time and/or on small consumer devices having multiple thermal and/or processing constraints; and 3.) maintain the performance requirements of a given style transfer application (e.g., the need to run multiple stylized video transfer operations concurrently and/or to run stylized video transfers on high-definition image data in real-time or near real-time) without the application crashing or the device shutting down, e.g., due to overheating and/or lack of processing power.

Various non-transitory program storage devices are disclosed. The program storage device are readable by one or more processors. Instructions may be stored on the program storage devices for causing the one or more processors to perform the various techniques described herein. Various methods of creating stylized video sequences are also disclosed herein, in accordance with the various techniques described herein. Various programmable electronic devices are also disclosed herein, in accordance with the various techniques described herein. Such electronic devices may include one or more optical sensors/camera units; a display; a user interface; a programmable control device, e.g., a central processing unit (CPU) and/or a graphics processing unit (GPU); and a memory coupled to the programmable control device. Instructions may be stored in the memory, the instructions causing the programmable control device to execute instructions in accordance with the various techniques described herein.

DETAILED DESCRIPTION

Figure 1:
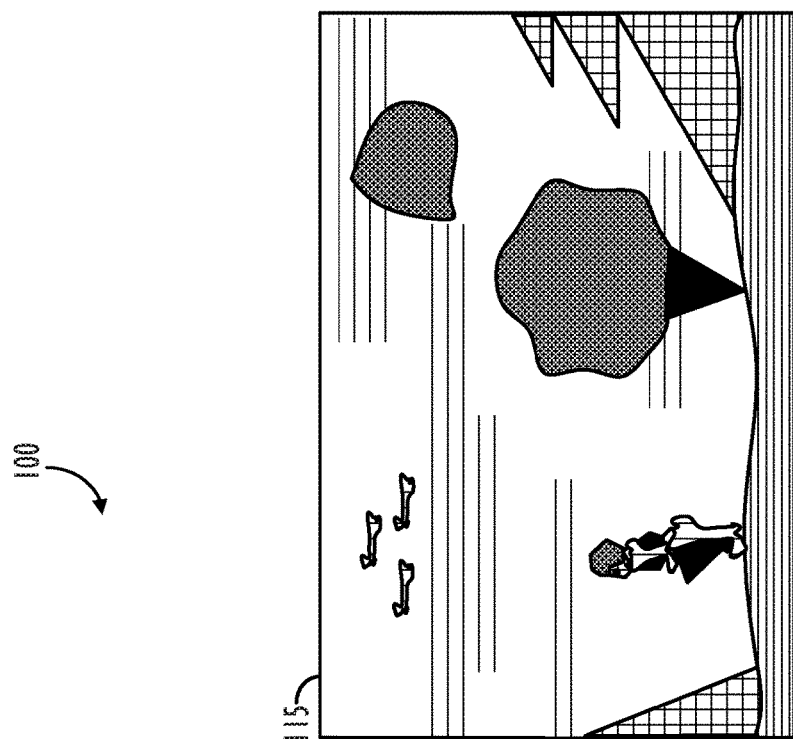
FIG. 1 is an example of an application of an extracted artistic style to a target image, according to one or more embodiments.
Figure 1:
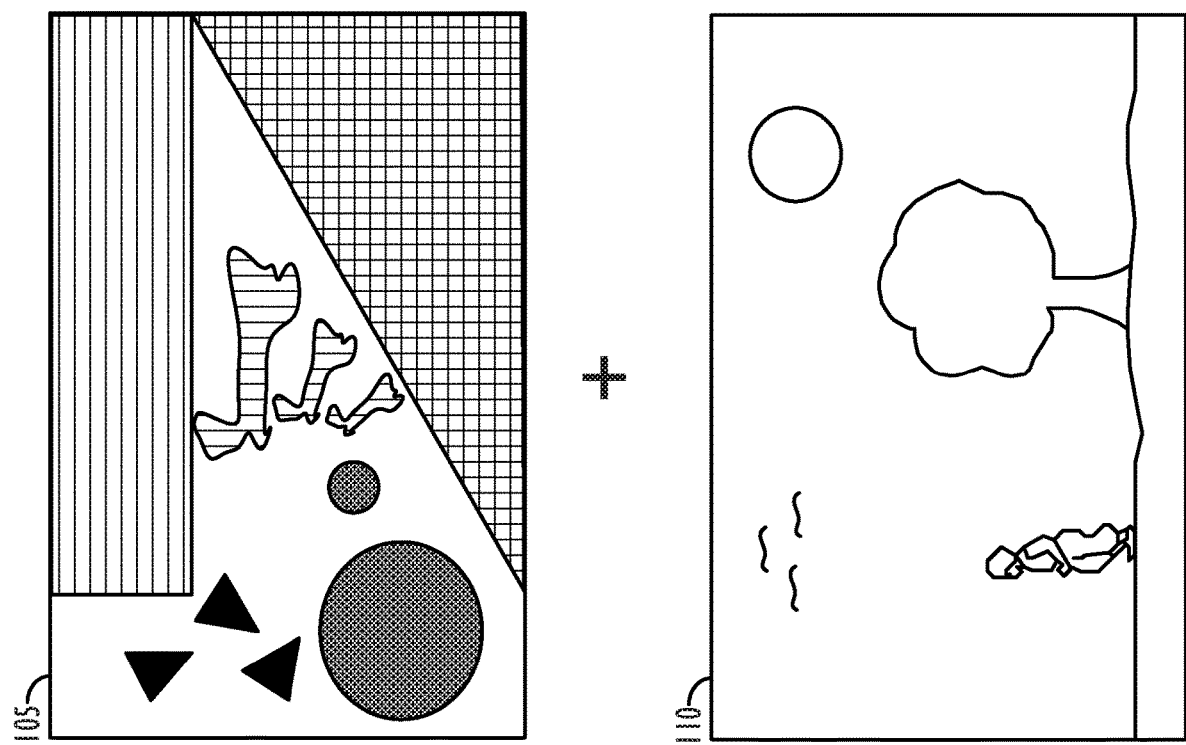

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

As explained in Gatys, one class of Deep Neural Networks (DNN) that are especially powerful in image processing tasks are known as Convolutional Neural Networks (CNNs). Convolutional Neural Networks consist of layers of small computational units that process visual information in a hierarchical fashion, e.g., often represented in the form of "layers." The output of a given layer consists of so-called "feature maps," i.e., differently-filtered versions of the input image. The information each layer contains about the input image can be directly visualized by reconstructing the image only from the feature maps in that layer. Higher layers in the network capture the high-level "content" in terms of objects and their arrangement in the input image but do not constrain the exact pixel values of the reconstruction. To obtain a representation of the "style" of an input image, Gatys proposes using a feature space that is built on top of the filter responses in multiple layers of the network and that consists of the correlations between the different filter responses over the spatial extent of the feature maps.

Because the representations of the content and the style of an image may be independently separated via the use of the CNN, both representations may also be manipulated independently to produce new and interesting (and perceptually meaningful) images. For example, as is explained in further detail below, new "stylized" versions of images may be synthesized by finding an image that simultaneously matches the content representation of the photograph (i.e., the "target image") and the style representation of the painting or other work of art that serves as the source style inspiration (i.e., the "source image"). Effectively, this synthesizes a new version of the photograph in the style of the artwork, such that the appearance of the synthesized image resembles the work of art stylistically, even though it shows generally the same content as the photograph. However, for at least the various reasons alluded to above, the Gatys algorithm may not perform well under more onerous device conditions (e.g., processing and/or thermal constraints), and is too computationally-intensive to be applied to stylize images—let alone video sequences—in real-time or near-real time. Thus, there is a need for further improvements in the field of artistic style transfer for images and video.

Referring now to FIG. 1, an example 100 of an application of an extracted artistic style to a target image is shown, according to one or more embodiments. In example 100, image 105 serves as the source image from which the artistic style will be extracted, and image 110 is the target image that will have the extracted artistic style applied to it to create a stylized version of the target image. In example 100, image 115 represents the resultant stylized version of the target image. It is to be understood that, although the term "artistic" style is used herein with reference to style elements extracted from the source image, the source image does not necessarily need to be a "work of art" or particularly "artistic," though, in some preferred embodiments, the source image may be an image of a painting (or other work of art), as mentioned above. As may be appreciated, any image may serve as a source image, and the stylistic elements of the source image may be extracted and separated from the structural/content elements of such source image, so that the "style" or "essence" of the source image may be applied to a target image with limited disruption to the structural/content elements of the target image, as is described more fully below.

As may now be more fully appreciated, the stylized version of the target image 115 largely retains the same content as the unstylized version of the target image 110. For example, the stylized version of the target image 115 retains the basic layout, shape and size of the main elements of the unstylized version of the target image 110, such as the runner, the tree, the Sun, and the three birds in the sky. However, various elements extracted from the artwork source image 105 are perceivable in the stylized version of the target image 115. For example, the texture from inside the two circles in source image 105 was applied to the Sun and the tree in the stylized version of the target image 115, while the shapes of the Sun and tree have been modified slightly, e.g., based on the contours of the three wavy, vertically-striped objects in the center of source image 105; the style of the black triangles from the source image 105 appear in the arms and legs of the runner and in the trunk of the tree in the stylized version of the target image 115; the horizontally-striped texture from the top of source image 105 was applied to the ground and portions of the sky in the stylized version of the target image 115; the square-filled triangular-shaped texture from the lower-right corner of source image 105 was applied to various portions of the stylized version of the target image 115 in triangular regions; and the contours and texture of the three wavy, vertically-striped objects in the center of source image 105 were applied to the birds in the stylized version of the target image 115.

As is to be understood, the stylized version of the target image 115 shown in FIG. 1 is merely exemplary of the types of style representations that may be extracted from a source image and applied to one or more target images. In a given implementation, the granularity of the style representations that are extracted from the source image and the degree to which one or more source image styles are combined and/or applied to the target image may each be customized to desired levels, e.g., so as to achieve a resulting stylized target image that is visually interesting.

Figure 2:
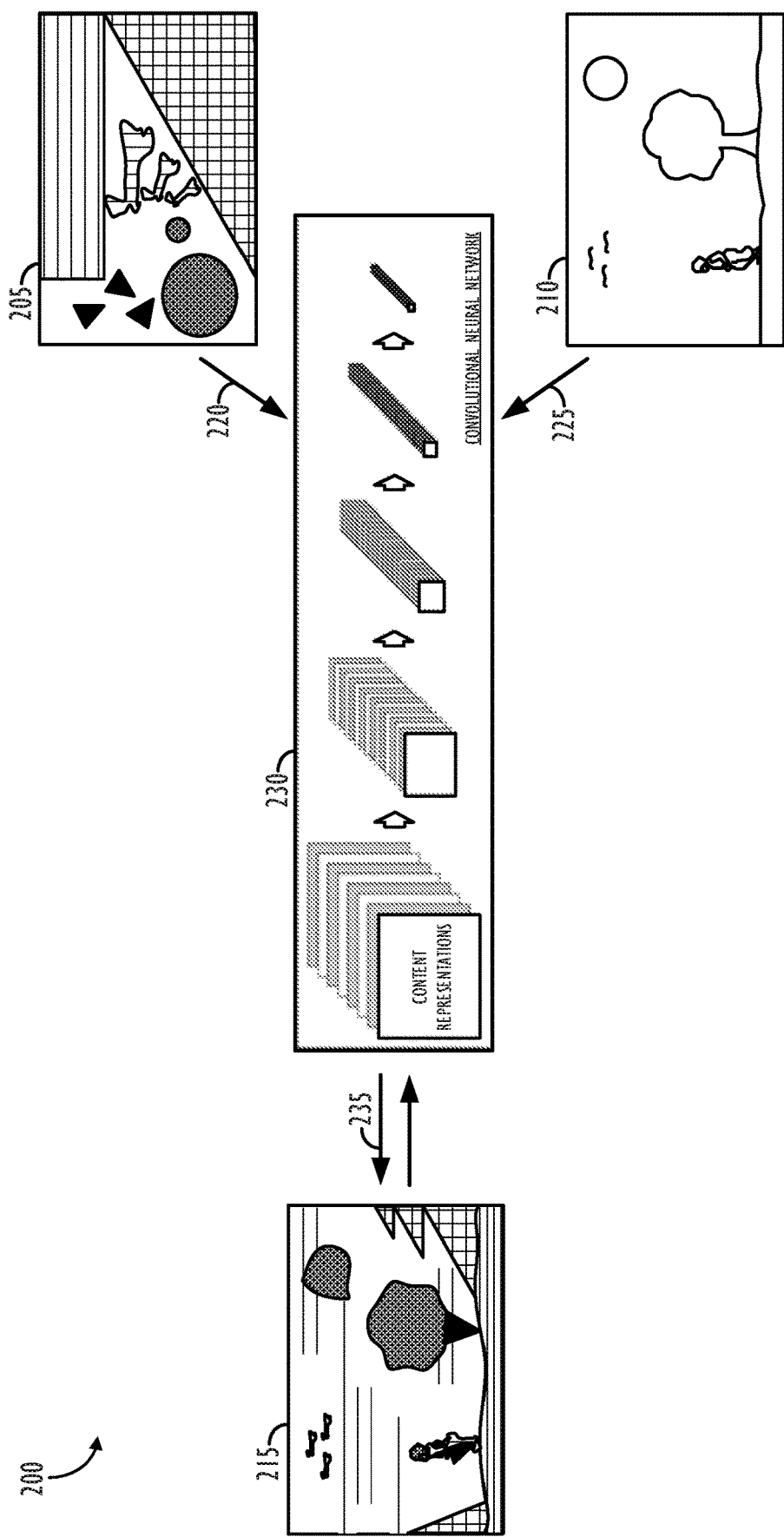
FIG. 2 is an example of a neural network for applying an extracted artistic style to a target image, according to one or more embodiments.

Referring now to FIG. 2, an example 200 of a neural network 230, e.g., a convolutional neural network (CNN), for applying an extracted artistic style to a target image is shown, according to one or more embodiments. In example 200, the source image 205 is the same as source image 105 described above with reference to FIG. 1, and the target image 210 is the same as the target image 110 described above with reference to FIG. 1. As shown, neural network 230 may be used to extract style representation information (220) from the source image 205 and also to extract content representation information (225) from the target image 210. Neural network 230 may then synthesize (235) various versions of a stylized target image 215. Increasing subsets of the CNN layers may be used to match the style representation of the source image in different manners. For example, the image structures that are able to be captured in the style representation may increase in size and complexity when including style features from higher layers of the neural network. The lower layers in neural network 230 may provide an almost perfect reconstruction of the input image, i.e., from a pixel and content standpoint, whereas the higher layers in neural network 230 may lose some pixel information but preserve higher level content representation from the input image.

While the example of FIG. 2 above shows a single neural network for the application of the selected artistic style, according to some embodiments, and as will be described in further detail below, more than one "version" of style transfer neural network may be created for each artistic style. The different versions of the neural networks may, e.g., operate at different resolution levels, have different numbers of layers, different kinds of layers, different network architectures, and/or have different optimizations applied. As will be explained below, the different versions of the neural networks require different levels of processing resources (and generate varying levels of thermal energy within the device), and, thus, their deployment may be optimized so that they may provide the best quality and/or frame rate of style transfer at any moment in time, given the device's current system performance parameters, e.g., processing load, power state, thermal state, etc.

DNN Style Transfer with Input Scaling

Figure 3A:
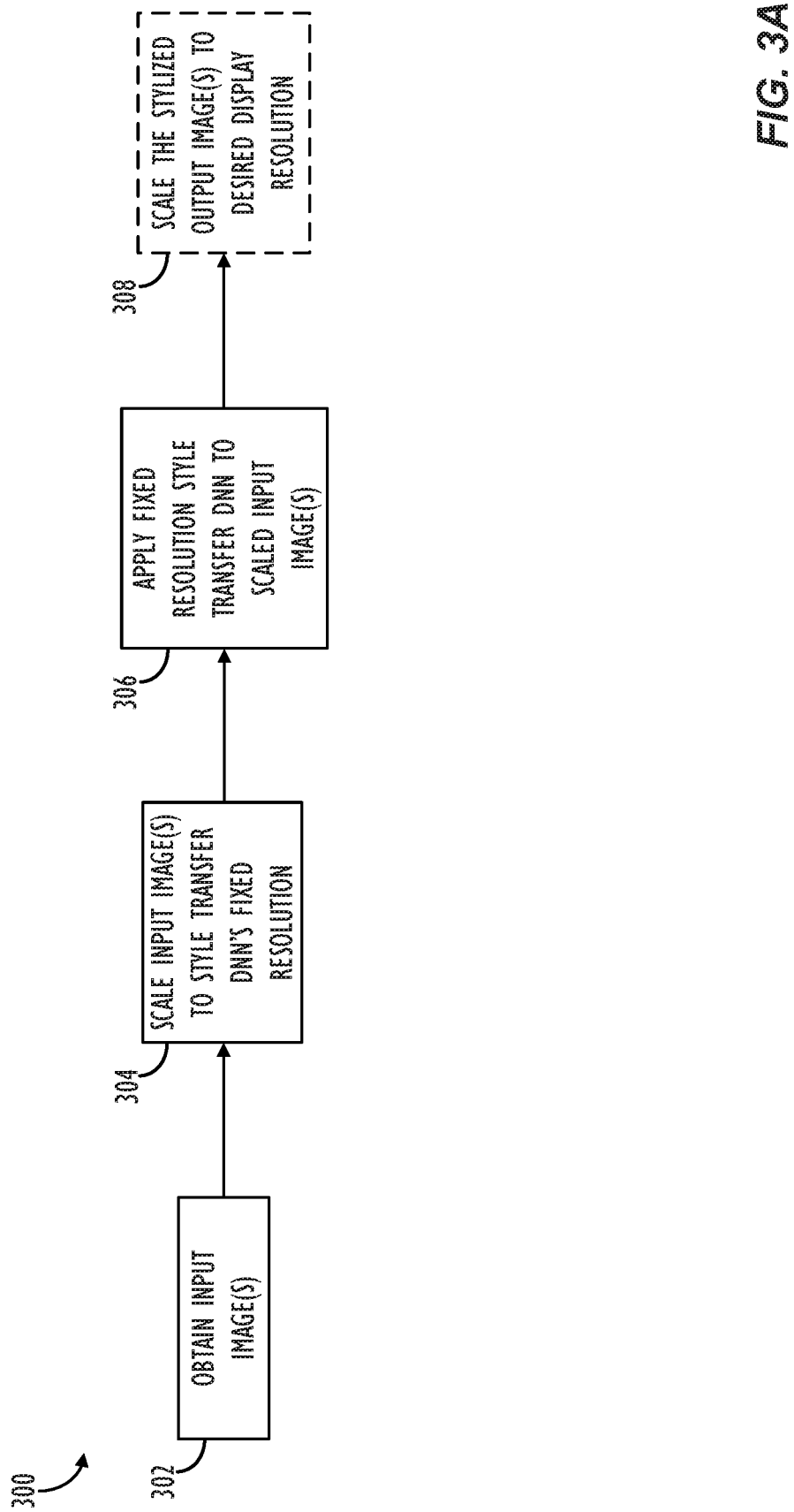
FIGS. 3A-3B are flowcharts illustrating a technique for generating a stylized image or video sequence using a fixed resolution style transfer network, according to one or more embodiments.

Referring now to FIG. 3A, a flowchart 300 illustrating a technique for generating a stylized image or video sequence using a single, fixed resolution style transfer network is shown, according to one or more embodiments. First, one or more input images may be obtained (Step 302). In this embodiment, it is assumed that an artistic style transfer to be applied to the input images has already been selected by a user, e.g., via a user interface, and obtained by the image processing device(s) that will be applying the artistic style to the obtained input images. Next, the input images may be scaled according to the selected single, fixed resolution style transfer network's resolution (Step 304). For example, according to some embodiments, the style transfer network may have a resolution of 720 pixels by 720 pixels, or 1080 pixels by 1080 pixels. In other embodiments, the resolution may not be perfectly square, and may instead comprise a rectangular resolution. Next, the fixed resolution style transfer network may be applied to the scaled input images (Step 306). Finally, an optional final step may be taken to scale the stylized output image back to a desired display resolution (Step 308). For example, in some embodiments, for improved performance, the resolution of the style transfer network may be smaller (or have a different aspect ratio) than the actual display resolution or aspect ratio of the stylized image that is saved or presented to a user. However, by utilizing the aforementioned scalar and fixed resolution network, the system may see increased performance, based at least on the fact that a new network does not have to be compiled and initialized (as well as an old network torn down) each time that a display resolution or aspect ratio changes during the real-time streaming of artistic style transfer results on a user's device. As will be described in further detail below, before the final change in resolution (and/or aspect ratio) begins, a resolution switch may be employed either by loading a different version of the currently-loaded DNN, e.g., at a different resolution, or by reshaping (i.e., modifying) one or more of the layers of the currently-loaded DNN.

Figure 3B:
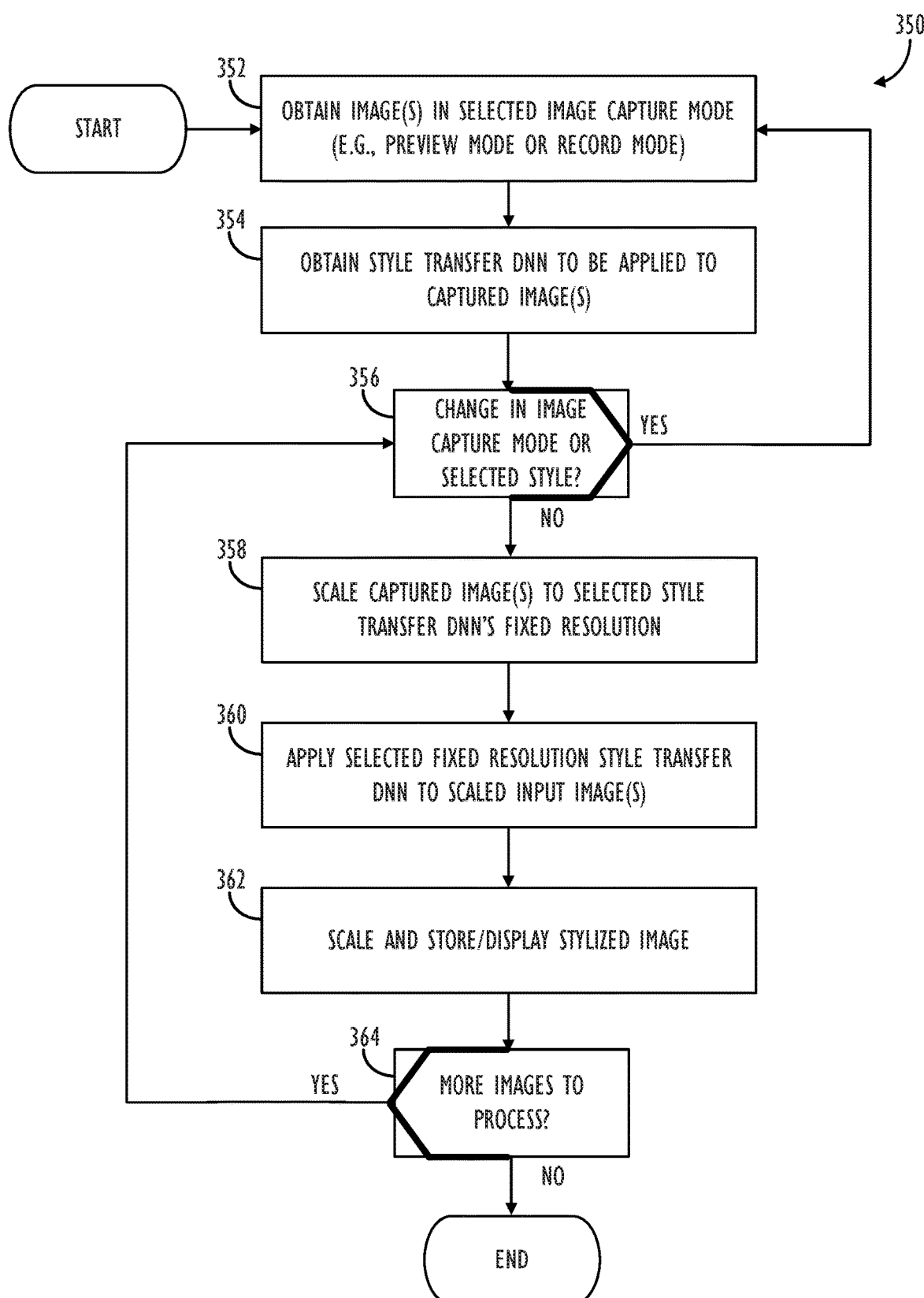

Referring now to FIG. 3B, a flowchart 350 illustrating a technique for generating a stylized image or video sequence using a fixed resolution style transfer network is shown in greater detail, according to one or more embodiments. First, at Step 352, the device executing the process 350 may capture images in a selected image capture mode. The capture mode may, e.g., comprise a "preview" mode, in which the images captured by the image sensor are streamed to a display on the image capture device, but are not written to long term memory storage. Alternately, the capture mode may comprise a "record" mode, in which the images captured by the image sensor are streamed to a display on the image capture device, as well as being written to long term memory storage. Likewise, the aforementioned record mode may involve the recording of individual images, or it may involve the recording of video sequences of multiple images. Each of the various capture modes mentioned above may have, e.g., different resolutions, different frame rates, different aspect ratios—and even dynamically differing frame rates over time, e.g., as a video sequence is recorded over the span of multiple minutes or hours.

According to prior art teachings, each such mode having different captured image properties would need a different artistic style transfer neural network, to wit, one that was optimized and/or sized for the particular resolution of the input images being received. However, as will be explained below, this limitation (and others) are overcome by the method described in FIG. 3B.

At Step 354, assuming the user has not already done so, a particular artistic style transfer may be selected to be applied to the input images. For example, an artistic style in the style of artwork source image 105 may be selected. In other embodiments, the user of the device may periodically (or continuously) be given the option to switch the artistic style being applied to the captured input images to a different style, e.g., a style based on a different artwork source image, or a different photographic image. In still other embodiments, the device may display more than one artistic style transferred version of the captured images at a time (e.g., in much lower resolutions and/or in a tiled array on the display of the device), unless or until a user selects one particular artistic style to be applied to the input images, at which point the selected artistic style may be applied at a higher resolution and/or frame rate that the multiple stylized tiled images were being display at.

At Step 356, the process will periodically (or instantaneously) check to determine whether there have been any relevant changes in the image capture mode and/or the selected artistic style, e.g., changes that would affect the resolution, aspect ratio, or frame rate, etc. of the incoming captured images. If there has been a relevant change (i.e., 'Y' at Step 356), the process may return to Step 352 to continue capturing images in the new mode and to Step 354 to update the selected artistic style, if necessary.

If, instead, there have not been any relevant changes (i.e., 'N' at Step 356), the process may proceed to Step 358, wherein the captured input images are scaled (e.g., by downscaling, upscaling, and/or aspect ratio scaling) to the dimensions of the fixed resolution style transfer network.

Next, at Step 360, the fixed resolution style transfer neural network may be used to process the correctly-scaled input images, thereby applying the desired stylization to the input images in an efficient manner, regardless of the dimensions or aspect ratio of the input images when they were originally captured. Finally, at Step 362, the stylized images at the resolution of the fixed resolution style transfer network may be re-scaled again to a different resolution (if desired), and then displayed and/or stored on the device. If there are more images being captured to process with the style transfer network (i.e., 'Y' at Step 364), the process may return to Step 356 to again poll the system to see whether there have been any relevant changes in image capture mode or the selected artistic style. If the user has indicated a desire to end the style transfer process (i.e., 'N' at Step 364), the process may end.

Real-Time Selection of DNN Style Transfer Networks from DNN Sets

Figure 4A:
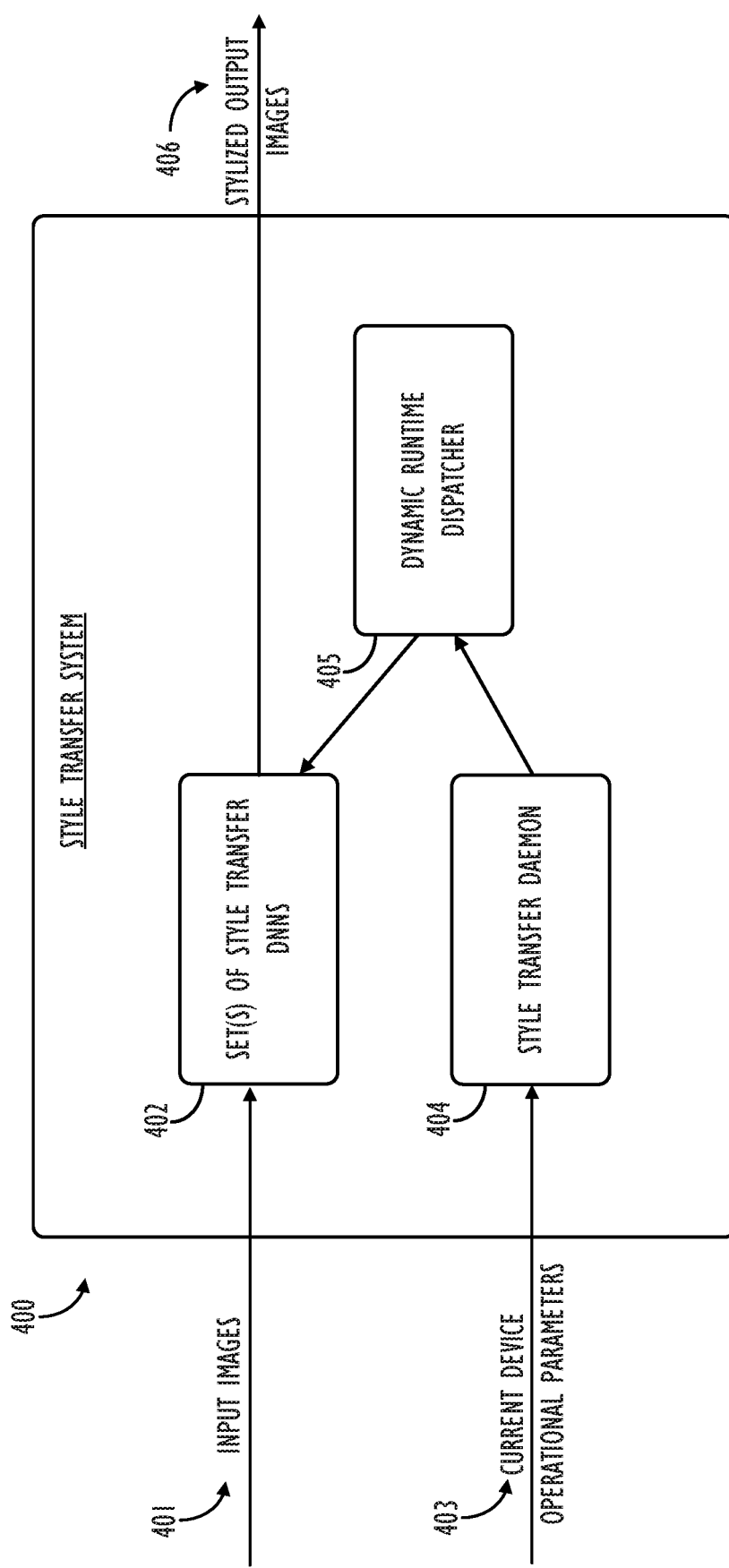
FIG. 4A is a block diagram of a system for assembling stylized images, according to one or more embodiments.

Referring now to FIG. 4A, a block diagram of a system 400 for assembling stylized images is illustrated in block diagram form, according to one or more embodiments. The style transfer system 400 may be thought of as having three relevant components for the discussion here: 1.) one or more "sets" of style transfer DNNs 402 (the meaning of DNN "sets" will be discussed in greater detail below; 2.) a style transfer daemon 404 running in the background and polling the device operating system for current device operational parameters (403); and 3.) a dynamic runtime dispatcher 405 which, as discussed in greater detail below, may be used to actually dynamically select the version of DNN used to apply the artistic style transfer and/or to dynamically adjust the selected DNN to accommodate the current device operational parameters as reported by the daemon 404.

As the captured input images (401) are fed into the style transfer system (400), an appropriate DNN from the set of style transfer DNNs (402) may be selected and/or modified for use, e.g., as directed by the dynamic runtime dispatcher 405 and based on the input regarding device operational parameters gathered by daemon 404. As the device operational parameters change over time, the dynamic runtime dispatcher 405 may intelligently select and/or modify the style transfer DNN being applied to the input images, so as to maintain a desired quality and/or framerate level in the stylized output images (406) being produced, without exceeding the operational capacity (e.g., power constraints, processing constraints, thermal constraints, etc.) presently available to the device to utilize on the real-time artistic style transfer process. According to some embodiments, the style transfer system may employ a shared memory pool in order to accelerate the selection and/or modification operations and reduce the overall memory footprint of having multiple style networks that are ready to be executed.

Figure 4B:
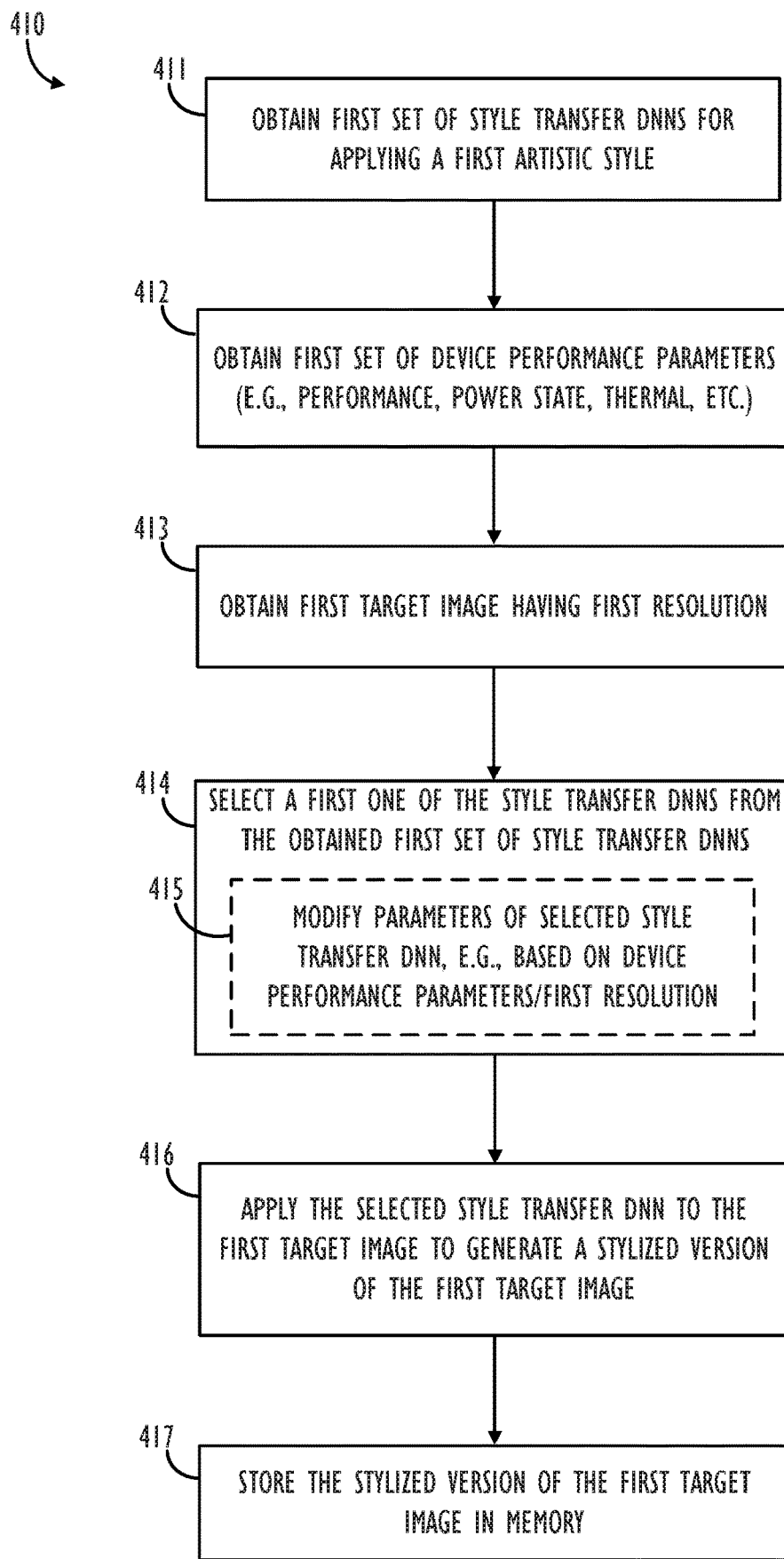
FIG. 4B is a flowchart illustrating a technique for generating a stylized image or video sequence by dynamically adjusting or selecting between multiple versions of style transfer networks, according to one or more embodiments.

Referring now to FIG. 4B, a flowchart 410 illustrating a technique for generating a stylized image or video sequence by dynamically selecting from (and/or modifying) multiple versions of style transfer networks is shown, according to one or more embodiments. (In this embodiment, it is assumed that the artistic style that is to be applied to captured images has already been selected by a user, e.g., via a user interface.) First, at Step 411, the method may obtain a first set of style transfer DNNs for applying a selected first artistic style, wherein, e.g., each DNN in the set comprises a different version of the style transfer DNN for the selected artistic style that is to be applied to the captured images. Next, at Step 412, a first set of device performance parameters may be obtained for the device that is executing the artistic style transfer process. For example, according to some embodiments, the device performance parameters may comprise one or more of: a power state, a battery state, a processing capacity state, a workload level, a thermal state, a device model, a system on a chip (SoC) model, one or more user settings (e.g., a low-power mode), an application state (e.g., image capture, video record, video preview, image playback, video playback, etc.), a memory usage state, and/or one or more temperature-related conditions. Next, the device may obtain a first target image having a first resolution (Step 413). Next, the device may select the appropriate version(s) of the selected style transfer DNN to use to apply the style, based, at least in part, on the obtained device performance parameters (Step 414). As will be discussed in further detail below, in some implementations, the appropriate version of the selected style transfer DNN may simply entail making one or more adjustments or modifications to the existing selected version of the style transfer DNN, e.g., by changing the resolution of image process by one or more layers of the DNN and/or simplifying (e.g., by reducing the accuracy or precision of) one or more computations made in the network (Step 415). Next, the selected and/or adjusted version of the style transfer DNN may be applied to the first target image to generate corresponding stylized output version of the first target image (Step 416). Finally, the stylized version of the first target image may be stored, e.g., in volatile or non-volatile memory of the device executing the style transfer process (Step 417).

Figure 4C:
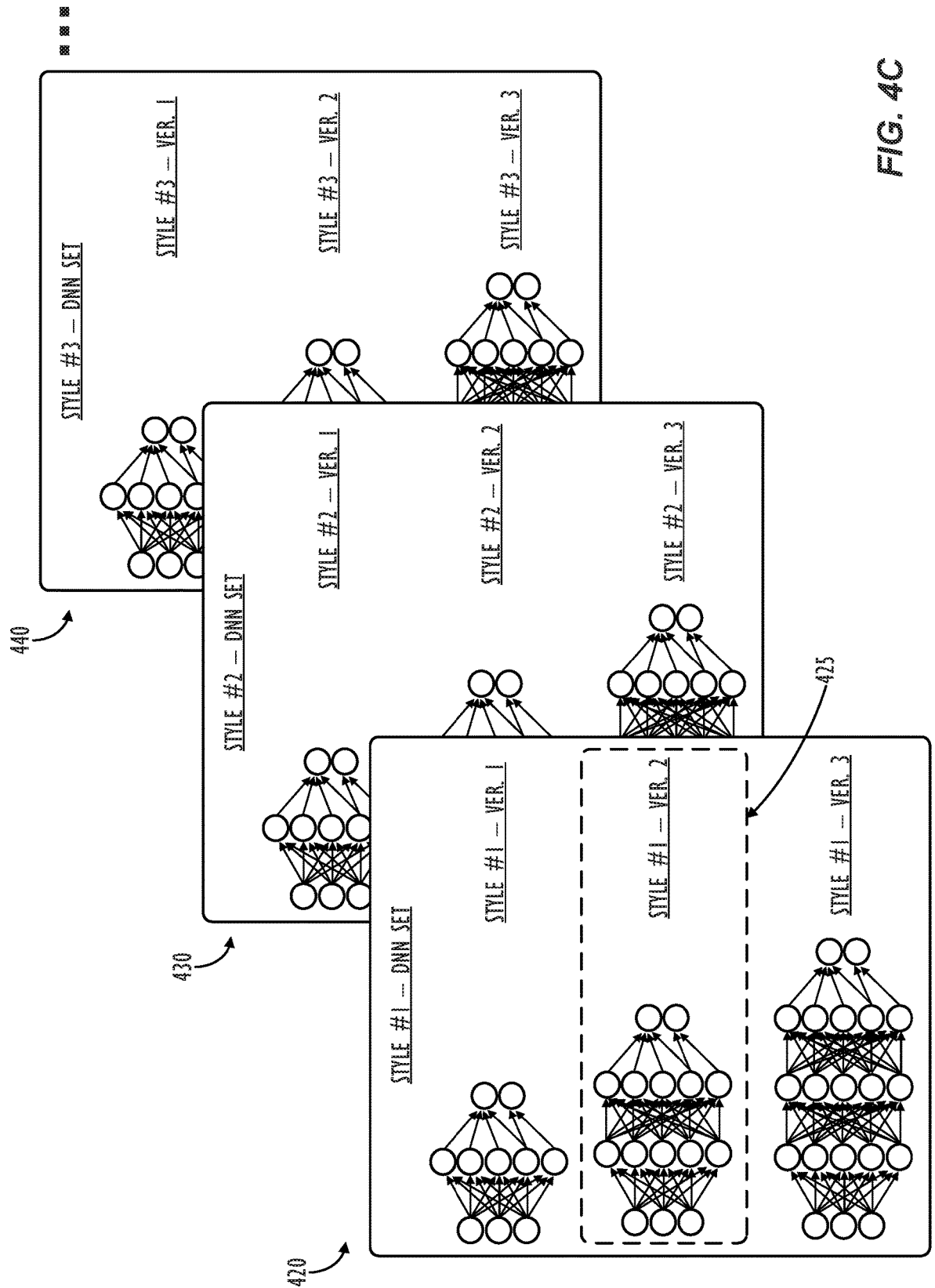
FIG. 4C illustrates sets of DNNs for various exemplary artistic styles, according to one or more embodiments.

Referring now to FIG. 4C, sets of DNNs for various exemplary artistic styles (420, 430, 440) are illustrated, according to one or more embodiments. As mentioned above, according to some embodiments, the style transfer system may store one or more "sets" of style transfer DNNs. For example, as shown in FIG. 4C, there is a set of DNNs for artistic style #1 (420), a set of DNNs for artistic style #2 (430), and a set of DNNs for artistic style #3 (440). Each of the artistic styles may be used to modify the look of incoming input images in different ways. Further, within each DNN "set," there may also be one or more "versions" of style transfers DNNs for the given artistic style. For example, with respect to artistic style #1 (420), there is a "Version 1" of the DNN that has one layer between the input and output, a "Version 2" of the DNN that has two layers between the input and the output, and a "Version 3" of the DNN that has three layers between the input and output.

It is to be understood that the versions of artistic style #1 in FIG. 4C are merely meant to be exemplary, and many other factors of the DNNs, e.g., the number of layers, the type of layers, the resolutions of the various layers, and the network architectures themselves (including whether the network is optimized for image style transfer or video style transfer), may differ between the various DNN versions within a given artistic style's DNN set. For example, DNN versions that are optimized for stylized video transfer may consider multiple frames at a time as they are processing the current image (e.g., frames coming temporally prior to or after the current frame), so as to take temporal estimates into account when applying the style to the current frame, in an effort to reduce unwanted flicker between consecutive frames.

In some embodiments, individual versions of a given DNN could be trained, optimized, and shipped for particular hardware/firmware device combinations. In this way, older devices could still run the style transfer networks at their optimum capacity, while newer devices, presumably with more powerful hardware and/or firmware could run more complex versions of the DNN, such as networks with more layers and/or that operate at a higher resolution. In other words, the techniques described herein break the prior art paradigm of having only one trained neural network per artistic style. Instead, by having many (e.g., two or more) trained neural networks per artistic style, the techniques described herein may operate more efficiently across a wide variety of devices and a wide range of operating conditions, including the ability to downgrade (or upgrade) in network complexity level for a given artistic style as device operating conditions deteriorate (or improve).

As mentioned above, various factors, including the device's present system performance parameters, may be analyzed by the device when determining which version of the artistic style's DNN set should be selected (and/or modified) and used to transfer the artistic style to incoming images at any given moment in time. For example, as shown in the example of FIG. 4C, Version 2 (425) of artistic style #1 has hypothetically been selected by the device, based on the device's current operational and processing capabilities. If, in the future, more resources (e.g., processing resources and/or thermal capacity) become available to the device as it is continuing to apply artistic style #1, the device may decide to smoothly transition to Version 3 of the network, which may, e.g., operate at a higher resolution or preserve a higher level of detail in the output image. Likewise, if, in the future, fewer resource become available to the device as it is continuing to apply artistic style #1, the device may decide to smoothly transition to Version 1 of the network, which may, e.g., operate at a lower resolution or preserve fewer details in the output image.

Figure 4D:
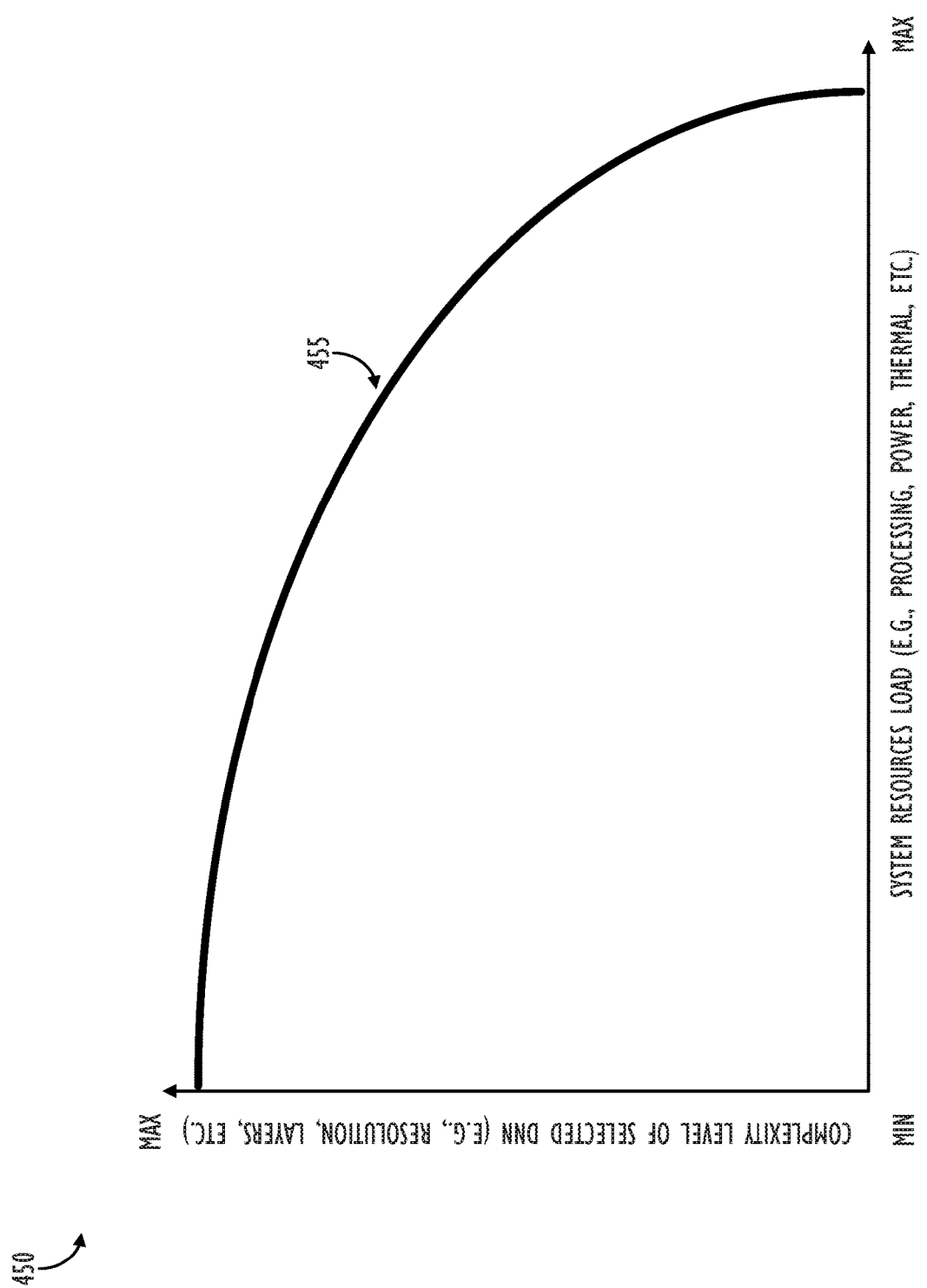
FIG. 4D is a graph illustrating the relationship between complexity level in a selected DNN used for artistic style transfer and present load on system resources, according to one or more embodiments.

Referring now to FIG. 4D, a graph 450 illustrating the relationship between complexity level in a selected DNN used for artistic style transfer (on the vertical axis) and present load on system resources (on the horizontal axis) is shown, according to one or more embodiments. As discussed above, the "complexity" level of a given DNN may be measured across one or more factors that affect the amount of processing that is required by the network. For example, the number of layers, the resolution of images that the network operates upon, and whether the network architecture has been optimized for image transfer or for video transfer are all factors upon which the overall complexity of the network may depend. In some embodiments, the measure of a network's complexity may be reduced to modeling the value of a single network parameter, such as the resolution of images that the network is operating upon (e.g., 180p, 360p, 480p, 600p, 640p, 720p, 1080p, etc.). Likewise, the "system resources" load of a given device may be measured across one or more factors that affect the performance capabilities of the device. For example, the processing load on the device's CPU and/or GPU, the status of other jobs pending for the device's CPU and/or GPU, the current thermal state of the device, the current power state of the device, and/or a current battery state of the device are all factors upon which the overall system resources load may depend. In some embodiments, the measure of a system's resource load may be reduced to modeling the value of a single parameter, such as the thermal state of the device (e.g., in terms of a particular degree value or a remaining thermal heat capacity of the device before its activity level will be throttled), wherein increased thermal levels in the device are generally reflective of a higher system resources load.

As may now be seen from the exemplary function 455 in the graph 450 of FIG. 4D, an intelligent system for the dynamic adjustment of style transfer DNNs based on device performance parameters may follow a generally inverse relationship between the complexity level of the DNN selected and the measured system resources load. In other words, as the load on the system continues to increase, the complexity of DNN used for the artistic style transfer should gradually decrease to account for the diminishing system resources available for the processing required by the style transfer operation. Of course, the exact relationship between these two factors (and, thus, the shape of function 455) may be determined for a given implementation and/or for a given device. For example, the relationship may be determined offline, e.g., empirically, before the device is manufactured, and one or more tables correlating device operating characteristics to optimum DNN network complexity may be shipped with the device, such that a simple lookup operation may be performed by the device to determine which version of DNN should be used (and/or what types of DNN adjustments should be made) at a given moment in time, based on the current operating characteristics of the device.

Figure 4E:
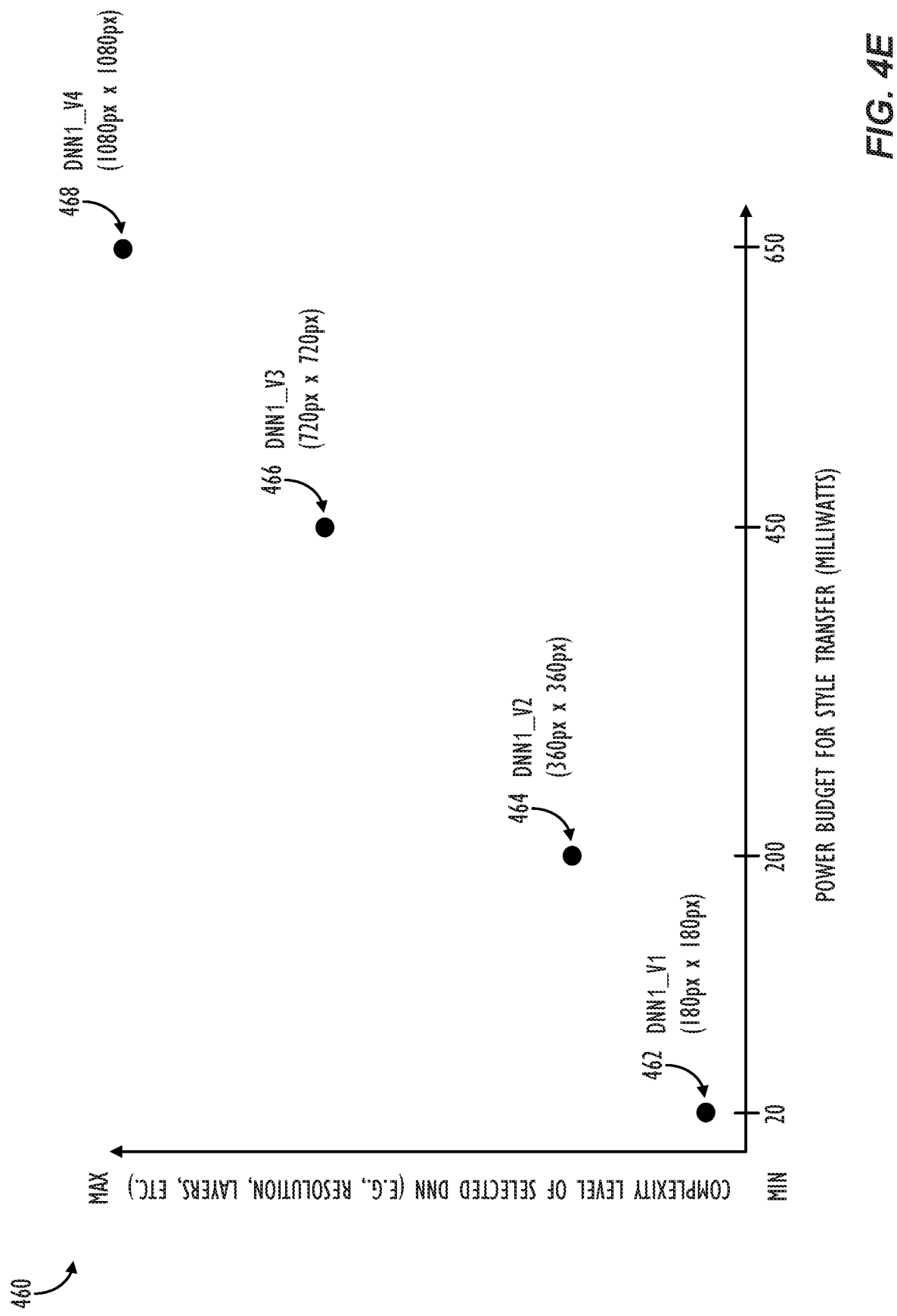
FIG. 4E is a graph illustrating the relationship between complexity level in a selected DNN used for artistic style transfer and the power budget presently available to the system for performing artistic style transfer operations, according to one or more embodiments.

Referring now to FIG. 4E, a graph 460 illustrating the relationship between complexity level in a selected DNN used for artistic style transfer (on the vertical axis) and the power budget presently available to the system (on the horizontal axis) for performing artistic style transfer operations is shown, according to one or more embodiments. As shown in FIG. 4E, the resources available to the system to perform artistic style have been reduced to a single factor, i.e., "power budget," for simplicity. The correspondence between various device operational parameters and the corresponding power budget available to the device may, e.g., be determined by a device's operating system and/or power control units in real-time. The relationship between power budget and DNN complexity may be determined offline, e.g., empirically, before the device is manufactured, and one or more tables correlating power budgets to optimum DNN network complexity may be shipped with the device, such that a simple lookup operation may be performed by the device to determine which version of DNN should be used (and/or what types of DNN adjustments should be made) at a given moment in time, based on the power budget presently available to the device. For example, as shown in exemplary graph 460 of FIG. 4E, assuming that a user is applying artistic style #1 to incoming images, when the power budget of the device is calculated to be 20 mW, the device will select Version 1 from the DNN set for artistic style #1 (462), having an exemplary resolution of 180 pixels by 180 pixels (see, e.g., FIG. 4C for examples of DNN sets). Similarly, when the power budget of the device is calculated to be 200 mW, the device will select Version 2 from the DNN set for artistic style #1 (464), having an increased exemplary resolution of 360 pixels by 360 pixels. When the power budget of the device is calculated to be 450 mW, the device will select Version 3 from the DNN set for artistic style #1 (466), having an increased exemplary resolution of 720 pixels by 720 pixels. Finally, when the power budget of the device is calculated to be 650 mW, the device will select Version 4 from the DNN set for artistic style #1 (468), having a maximum exemplary resolution of 1080 pixels by 1080 pixels. In this hypothetical example, 1080 pixels by 1080 pixels may be the maximum resolution (and thus maximum quality) version of style transfer network for artistic style #1 that the device possesses. Thus, so long as the power budget remains at or above 650 mW, the device may continue to utilize Version 4 of the selected DNN. Then, as the power budget for performing artistic style transfer decreases, the device may gracefully transition down to the less complex versions of the style transfer DNN as the power budget sequentially decreases below the next power budget threshold value for which a corresponding DNN complexity level has been specified, as shown in graph 460. [It is to be understood that, in other embodiments, rather than switching between different DNN versions of the same artistic style, as described above, it would be possible to, e.g., continue to use the same DNN version and simply modify the resolution and/or precision of one or more parts of the DNN's architecture in order to reduce or increase the complexity level of the DNN being used.]

Figure 4F:
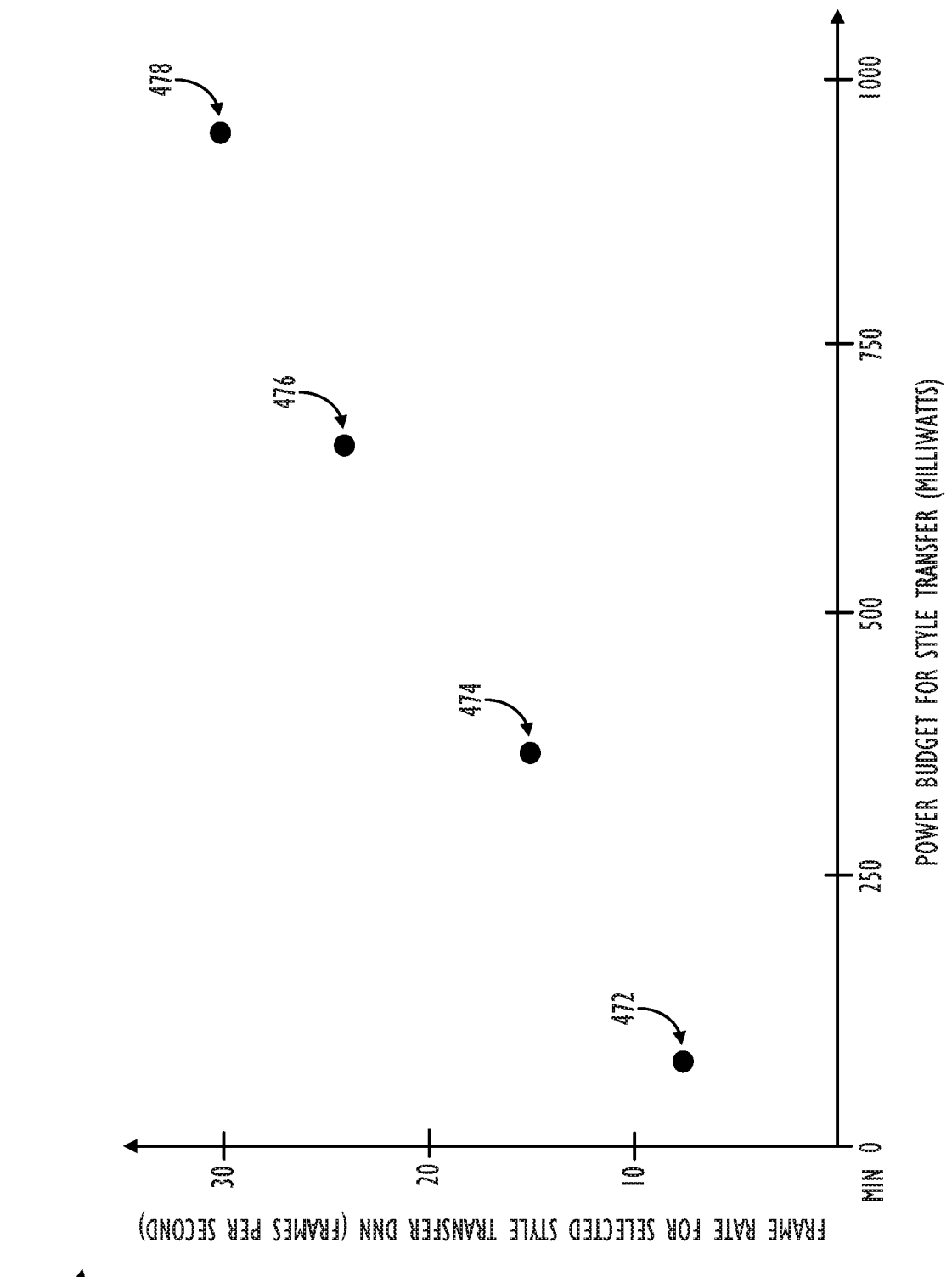
FIG. 4F is a graph illustrating the relationship between the maximum attainable frame rate for a selected DNN used for artistic style transfer and the power budget presently available to the system for performing artistic style transfer operations, according to one or more embodiments.

Referring now to FIG. 4F, a graph 470 illustrating the relationship between the maximum attainable frame rate for a selected DNN used for artistic style transfer (on the vertical axis) and the power budget presently available to the system (on the horizontal axis) for performing artistic style transfer operations is shown, according to one or more embodiments. As may be expected, operating the real-time style transfer network methods described herein at higher frame rates requires even greater processing resources (and, likewise, generates greater heat) than operating the same style transfer networks at lower frame rates. Thus, in some embodiments, the amount of processing resources consumed (and, likewise, heat generated) may be controlled, at least in part, by controlling the frame rate of the style transfer operations. For example, as shown in the hypothetical example of FIG. 4F, if the power budget allocated to the device for performing style is 50 mW, the style transfer may operate at a lowest acceptable frame rate, e.g., 8 frames per second (fps) (472). As the power budget increases, e.g., to 375 mW, a higher frame rate, e.g., 14 fps (474) may be attainable, followed by 24 fps (476) at a power budget of 650 mW, and a frame rate of 30 fps (478) at a power budget of 900 mW or higher. Of course, any of the various other DNN adjustment methods described above (e.g., selecting a different network or modifying a currently selected network's architecture or precision) may also be used, in addition to modifications of frame rate, to control the processing resources utilized by the style transfer process. Empirical studies have shown that the methods described herein, while operating on personal mobile handheld electronic devices, can achieve comparable style transfer results to desktop supercomputers with multiple dedicated GPUs, despite operating with a power budget that is roughly 1,000 times lower (e.g., on the order of 1 kilowatt for the desktop computer versus on the order of 1 watt for the handheld electronic device).

Real-Time Adjustment of (Hybrid) DNN Style Transfer Networks

Figure 5A:
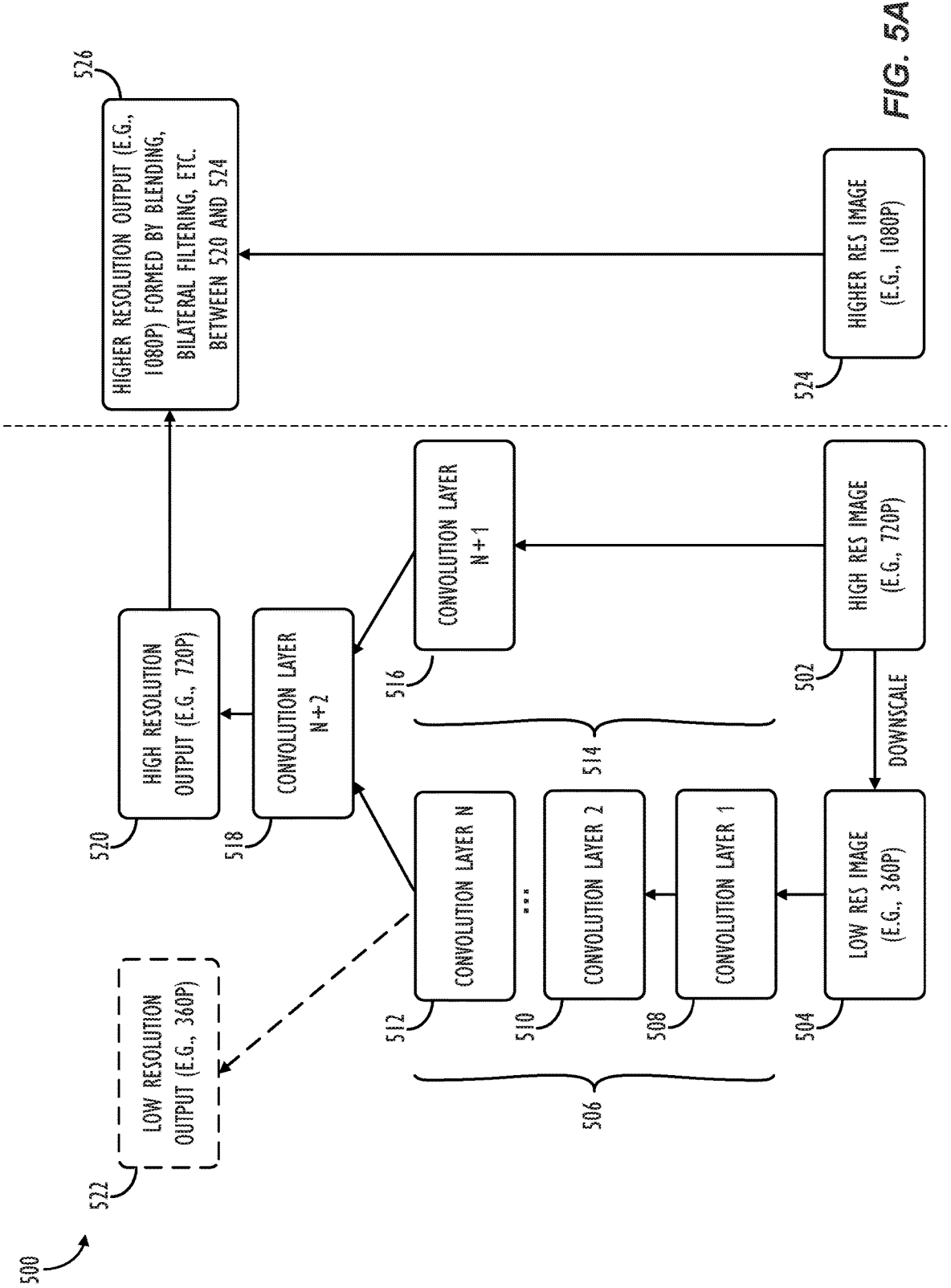
FIGS. 5A-5C illustrates examples of a dynamically adjustable neural network under various system performance parameters, according to one or more embodiments.
Figure 5B:
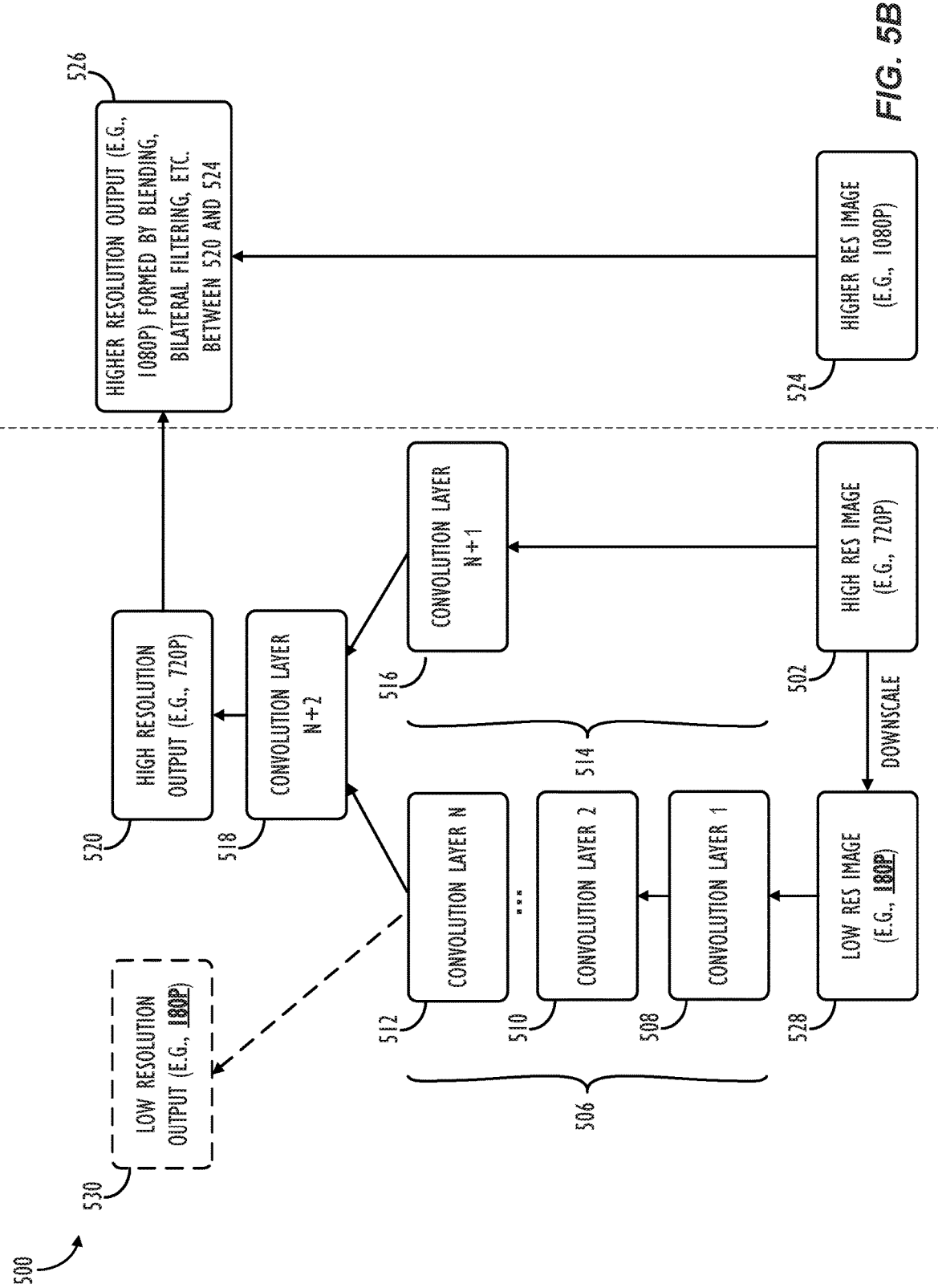
Figure 5C:
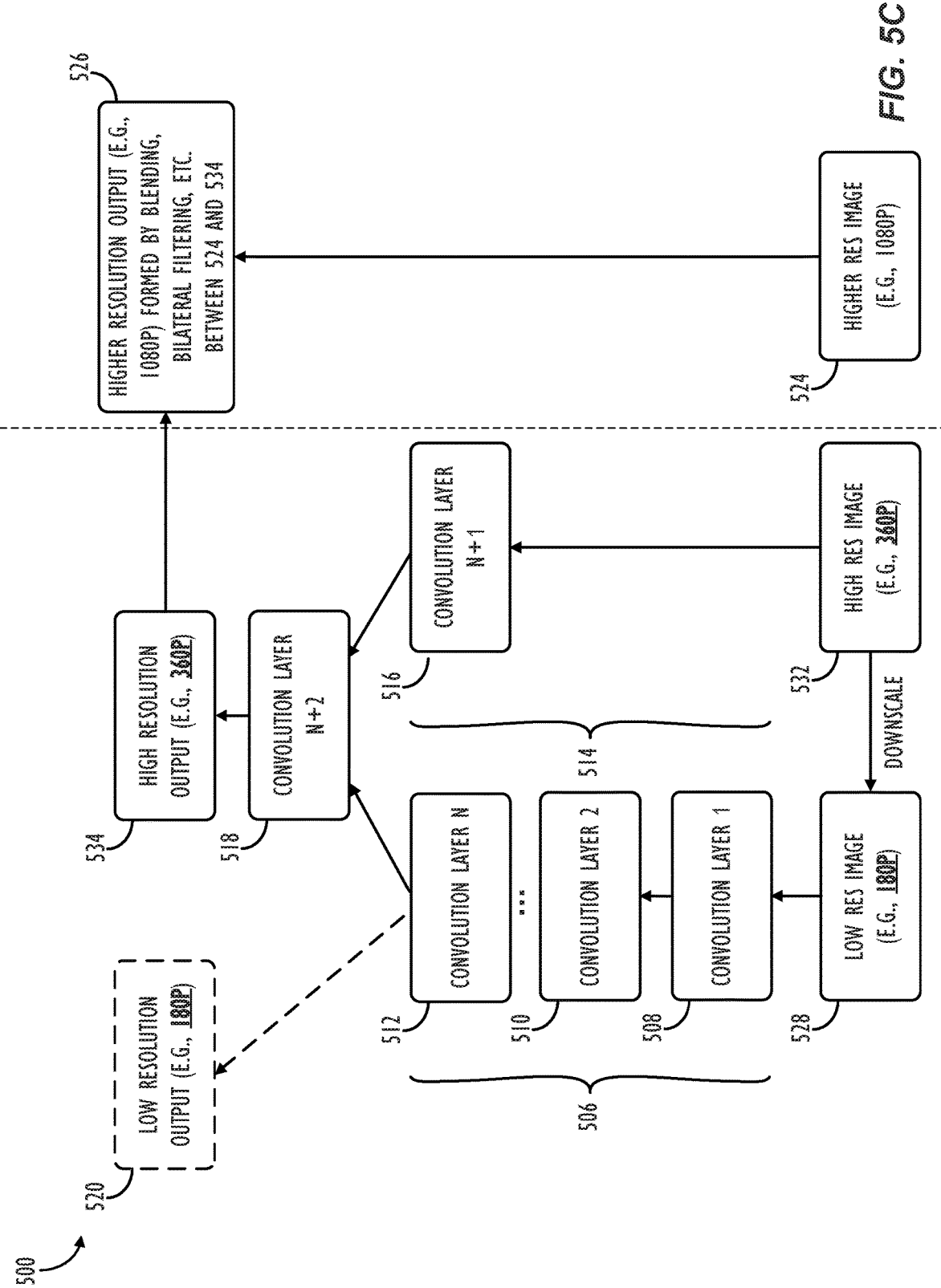

Referring now to FIGS. 5A-5C, examples of a dynamically adjustable neural network are illustrated as they would be constituted under various hypothetical system performance parameters, according to one or more embodiments. As shown in FIG. 5A, the dynamically adjustable neural network 500 may comprise a hybrid architecture, e.g., including a first part, e.g., lower resolution network (506), that may be more computationally expensive due to the existence of many convolutional layers (e.g., 508, 510, 512, etc.) and a second part, e.g., higher resolution network (514) that may be less computationally expensive due to the existence of many fewer (or even a single) convolutional layer (e.g., 516). In some implementations, the use of a hybrid network architecture (e.g., with two or more parts having distinct characteristics and used in distinct ways or situations) has empirically been shown to cut processing time required to stylize images by a factor of up to four, while still achieving results that look nearly as good as prior art networks that utilize exclusively high resolution layers.

As shown in FIG. 5A, the higher resolution network 514 may operate on incoming image data (502), e.g., a first target image that an artistic style is to be applied to, which is at a higher resolution, e.g., 720p (meaning 720 rows of pixels per image). This higher resolution network may, in part, be used to preserve the edges, textures, or other high resolution details in the original input image. However, the effects of the lower resolution part may be mitigated by only using a single convolutional layer (e.g., 516) at that resolution. Concurrently (or subsequently) to the processing being performed by higher resolution network 514, the input image may be downscaled to a lower resolution, e.g., 360p, by use of a hardware and/or software scalar and passed to the lower resolution network 506 in the form of a low resolution input image (504).

The output of the lower resolution network 506, i.e., after processing by each of convolutional layers 1 ... N in the network (as well as one or more additional optional low resolution convolutions following layer N, if needed), may be output as its own low resolution stylized output image (522), if so desired. According to some embodiments utilizing a hybrid network architecture, such as the network 500 shown in FIG. 5A, the output of the higher resolution network 514, i.e., after processing by convolutional layer N+1 (516), may be combined with the output of the lower resolution network 506, i.e., after processing by convolutional layer N (512), and processed by a further convolutional layer(s) in the network, e.g., convolutional layer N+2 (518), thus resulting in a high resolution stylized output image (520). [Additional upsampling and/or downsampling layers (not pictured) may also be employed by lower resolution network 506 so that layer 518 may readily combine the output of layer 516 with the output of layer 512 in the same layer 518.]

According to some embodiments, further enhancements and/or adjustments may be made to the high resolution stylized output image (520). In one such embodiment, the high resolution stylized output image (520) may be combined with an input image, e.g., an even higher resolution input image (524), such as the original image captured by the device. At block 526, an enhanced higher resolution output image may be generated, e.g., by blending between the high resolution stylized output image (520) and the higher resolution input image (524). In some embodiments, the blending process may comprise the use of bilateral filter and/or Lanczos filter (or similar desired filter) to smooth the upscaling of the stylized output to the even higher resolution level. In other embodiments, block 526 may comprise the use of an edge enhancement algorithm to bring back out the edges from the original captured image. By allowing the user the option of controlling the degree of blending between the high resolution stylized output image (520) and the higher resolution input image (524), the network 500 may provide the user with control over the "feeling" of the output image, e.g., how much of style (e.g., the hue) of the original image is imparted into the final image. In this way, the output image may be intentionally over-saturated, made to look black and white, or the user may attempt to accurately reflect the hues in the original captured input image, etc. Due to the real-time nature of the network and the efficiency of the hybrid architecture, the final blending step of block 526 may also be adjusted and reflected in real-time, should the user so desire.

According to some embodiments, the specification of the network architecture, such as the exemplary network 500 discussed above, may be stored in an intermediate representation (IR) format, i.e., a neural network data structure format that can be understood and parsed by any application with knowledge of the IR format. The use of an IR format may aid in the exchange and modification of style transfer DNNs around the world, as well as their customization for particular device hardware/software combinations.

Turning now to FIG. 5B, an exemplary adjustment to the network 500 architecture is illustrated. As described above, a dynamic runtime dispatcher 405 may be continuously processing various input information regarding device operational parameters gathered, as gathered by a system daemon 404. As the device operational parameters change over time, the dynamic runtime dispatcher 405 may intelligently modify the network 500, so as to attempt to maintain a desired quality and/or frame rate level in the stylized output images being produced, without exceeding the operational capacity (e.g., power constraints, processing constraints, thermal constraints, etc.) presently available to the device.

In the example of FIG. 5B, the device's operational parameters have changed in such a way that it is desirable to lessen the computational load of the network 500. For example, an increase in the thermal levels within the device or a decrease in the processing resources available for artistic style transfer may have necessitated the need to adjust the network 500. In the example of FIG. 5B, the computational load of the network 500 has been reduced by changing the resolution of the low resolution input image (528), e.g., from 360p down to 180p. [This would also mean that any low resolution output image produced (530) would also have the reduced, e.g., 180p, resolution.] Lowering the resolution of low resolution image may be a helpful first step in reducing the overall computational load of the style transfer network because the lower resolution network (506) may be more overall computationally expensive than the higher resolution network (514), due to the existence of many convolutional layers (e.g., 508, 510, 512, etc.). When the resolution of image being processed by each layer is reduced, the number of computations needed by the network may be greatly reduced.

Turning now to FIG. 5C, another exemplary adjustment to the network 500 architecture is illustrated. In the example of FIG. 5C, the device's operational parameters have changed in such a way that it is desirable to lessen the computational load of the network 500 even farther than they were lowered in the example of FIG. 513. For example, an additional increase in the thermal levels within the device or a further decrease in the processing resources available for artistic style transfer may have necessitated the need to further adjust the network 500. In the example of FIG. 5C, the computational load of the network 500 has been reduced by changing the resolution of the high resolution input image (532), e.g., from 720p down to 360p. [This would also mean that any high resolution output image produced (534) would also have the reduced, e.g., 360p, resolution.]

As may now be appreciated, various dynamic adjustment schemes may be employed to lower the overall computational load on the network 500. For example, one part of the hybrid network may first be lowered in increments down to its minimum acceptable image resolution, followed by lowering the resolution in one or more other parts of a hybrid network to its respective acceptable image resolution (as illustrated in the examples of FIGS. 5B-5C). Alternately, two or more parts of a hybrid network may have their resolutions lowered concurrently. In further implementations, one or more layers of the network may be bypassed altogether to reduce computational load. In still other implementations, one or more computational tasks may be completed with lowered precision (e.g., the subsampling in computations involving layers statistics and/or value accumulation may be completed with lowered precision), wherein the lowered precision saves computations—but still provides aesthetically satisfactory stylized output images.

Figure 5D:
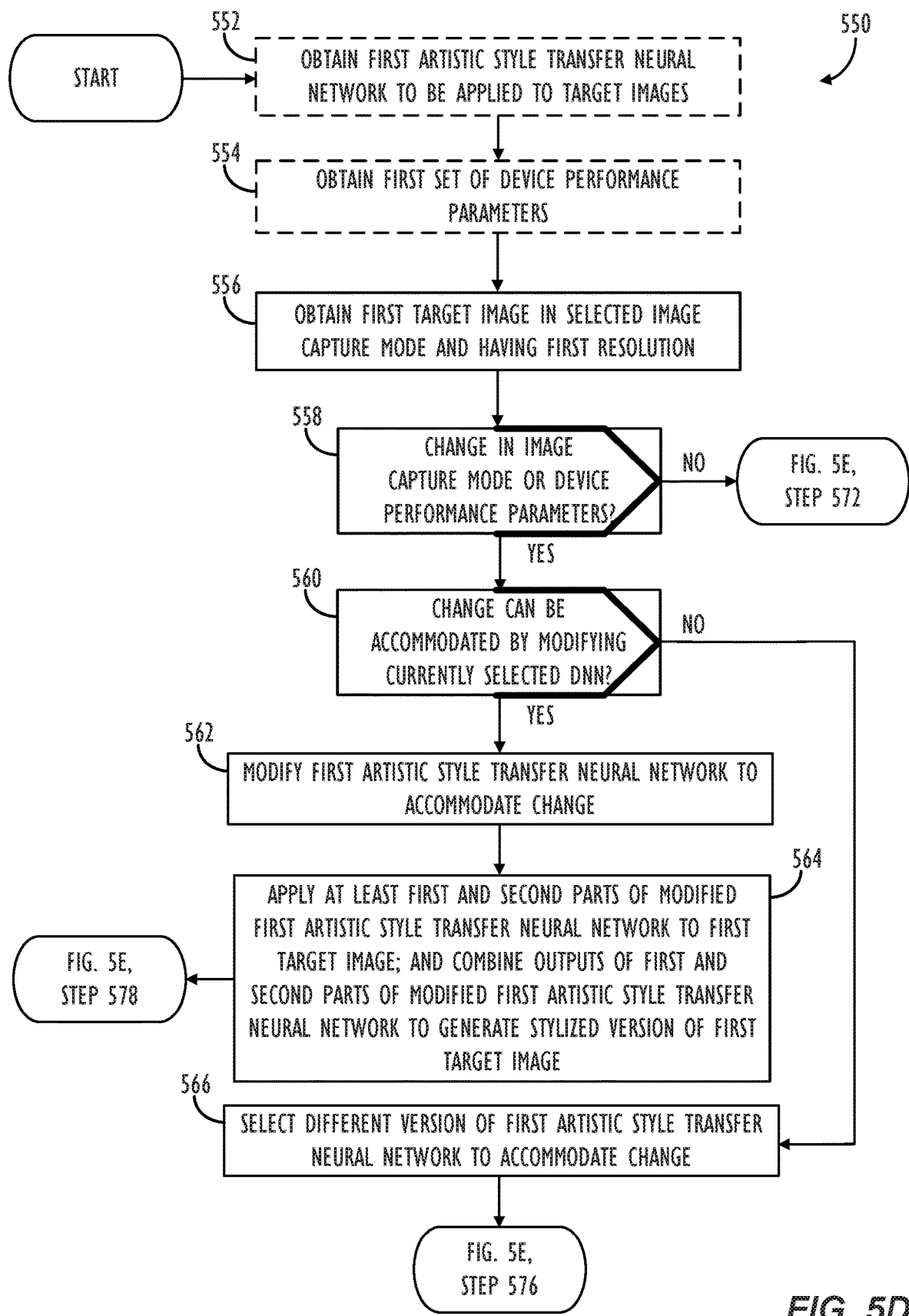
FIGS. 5D-5E are flowcharts illustrating a technique for generating a stylized image or video sequence using a set of one or more dynamically adjustable style transfer DNNs, according to one or more embodiments.
Figure 5E:
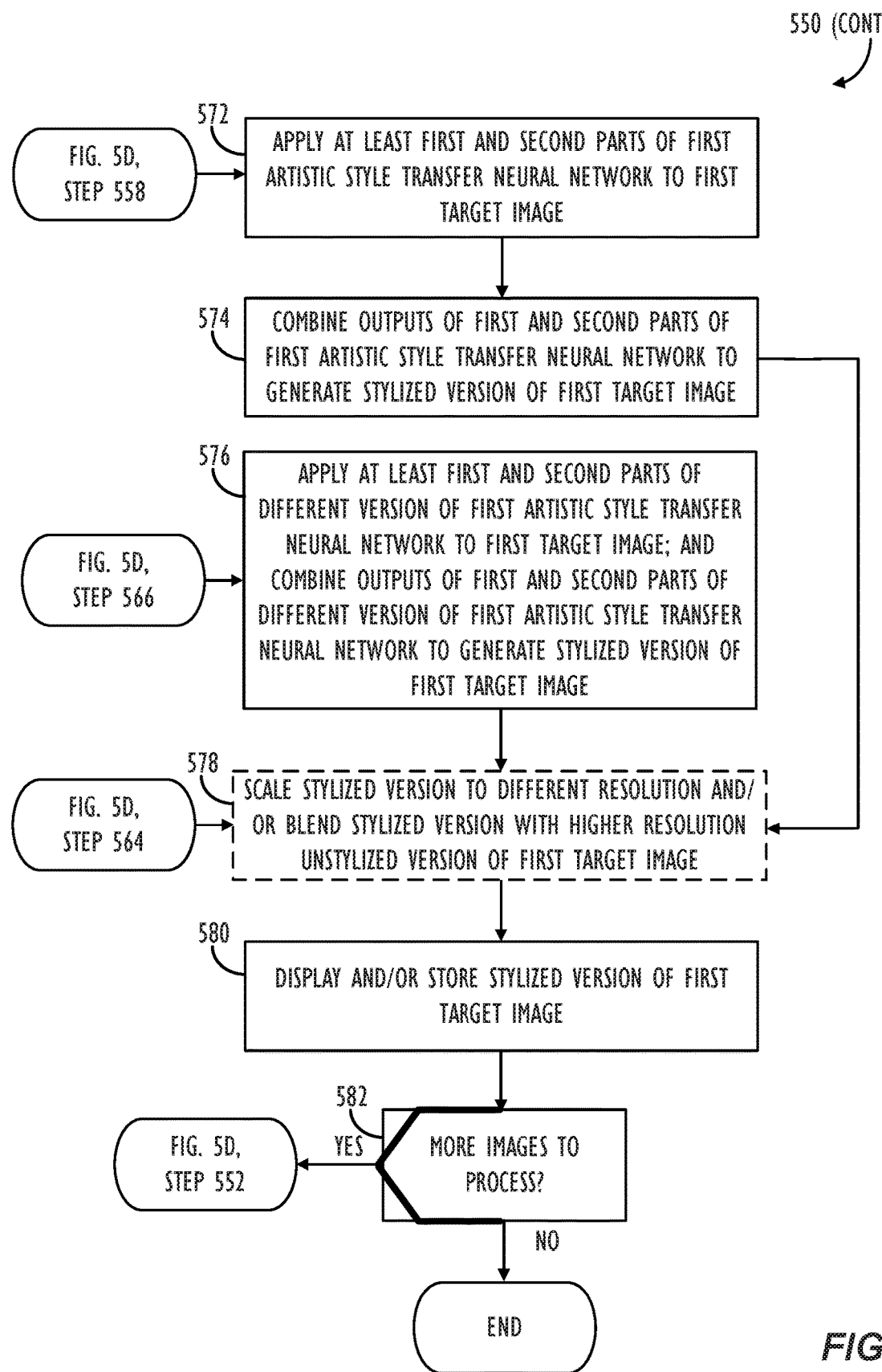

Referring now to FIGS. 5D-5E, flowcharts illustrating a technique for generating a stylized image or video sequence using a set of one or more dynamically adjustable style transfer DNNs are shown, according to one or more embodiments. As shown in FIG. 5D, the process 550 may begin by obtaining a first artistic style transfer neural network that is to be applied to target images. (Step 552). This step is illustrated as being optional (as indicated by the dashed line box) because, in some instances, the artistic style will have already been obtained by the device and will not need to be obtained again. In still other embodiments, one or more artistic styles may already be being generated in a low resolution (e.g., "preview mode"), while the system awaits the user's selection of one of the artistic styles to apply at a higher (e.g., full screen) resolution. Next, at Step 554, the aforementioned system performance parameters may be gathered (e.g., performance, power state, thermal state, etc.). This step is also illustrated as being optional because, in some instances, the performance parameters will only be gathered periodically, e.g., at a regularly-scheduled interval. In other embodiments, the performance parameters may be pushed to the artistic style transfer system any time they have crossed a particular threshold causing the system to need to make some kind of adjustment to the selected style transfer network. Next, at Step 556, a first target image may be obtained in the currently selected image capture mode (e.g., such as the aforementioned 'preview' or 'record' modes) and at a first resolution.

At Step 558, the process 550 may determine whether any changes in capture mode or device performance parameters have taken place since the last time such values were measured or sampled by the system. If not, the process may proceed to Step 572, shown in FIG. 5E. If, instead, there have been changes in capture mode or system performance parameters since the last time such values were measured or sampled by the system, the process may proceed to Step 560 to determine whether such changes may be accommodated for by modifying the currently selected DNN, e.g., by lowering the resolution of one or more parts of the network architecture, as described above with reference to FIGS. 5B-5C. If the changes may be accommodated for by modifying the currently selected DNN (i.e., 'Y' at Step 560), the process may proceed to Step 562 to make the appropriate modifications to the currently selected network and then Step 564 to apply at least first and second parts of the modified first artistic style transfer network to the first target image and then combine the outputs of the first and second parts of the modified first artistic style transfer network to generate a stylized version of the first target image, before finally proceeding to Step 578, shown in FIG. 5E. According to some embodiments, the method 550 may further comprise scaling the first target image, e.g., based on a configuration of the selected first artistic style transfer network (which may comprise upscaling or downscaling the first target image, based on a given implementation), in order to generate a first scaled target image, and then applying the aforementioned at least first part of the first artistic style transfer network to the first target image, while applying the aforementioned at least second part of the first artistic style transfer network to the first scaled target image. According to some such embodiments, the second part of the selected first artistic style transfer network comprises a number of convolutional layers that is greater than the number of convolutional layers in the first part of the selected first artistic style transfer network. If, instead, the changes may not be accommodated for by modifying the currently selected DNN (i.e., 'N' at Step 560), the process may proceed to Step 566 to select a different version of the first artistic style transfer network (e.g., a version that requires less processing resources) and then proceed to Step 576, shown in FIG. 5E, to apply at least first and second parts of the selected different version of the first artistic style transfer network to the first target image and then combine the outputs of the first and second parts of the selected different version of the first artistic style transfer network to generate a stylized version of the first target image, before finally proceeding to Step 578. Selecting the appropriate version of the selected first artistic style transfer network may comprise, e.g., selecting one of the DNNs from a DNN "set" provided for the currently selected artistic style (see, e.g., FIG. 4C).

It should be noted that the decision as to whether changes in operational mode or system performance parameters can be accommodated at Step 560 may also include modifying the network in a way that adds more computational requirements to the network, or selecting a version of the style transfer network requiring more computational resources, e.g., in the event that the system performance parameters obtained at Step 554 indicate that the thermal conditions of the device have cooled off or that more processing resources are available to the device for the performance of style transfer activities. In this way, the device can be optimized to always deliver the highest level of quality output images that the device is able to provide at any given moment, from both a thermal standpoint and a processing/power resource standpoint.

It should further be noted that, in some embodiments, merely running in a particular image capture mode (e.g., "preview mode") for longer than a threshold amount of time may also be considered a change in operational mode that requires accommodation. For example, even streaming lower-resolution (and/or lower frame rate) stylized preview images for longer than a threshold amount of time, e.g., 5 minutes, may contribute to an increase in the thermal state of the device. Thus, after the threshold amount of time has passed, it may be desirable or necessary to modify the current network (or select a less computationally-intensive network) and/or frame rate if the user wishes to continue streaming stylized output images in preview mode, so that the electronic device performing the style transfer does not overheat (or come close to overheating) as soon as the user actually switches the electronic device into "record mode." Likewise, if the user records stylized video images for longer than a threshold amount of time, it may be desirable or necessary to modify the current network (or select a less computationally-intensive network) and/or frame rate if the user wishes to continue recording, otherwise, the recording may have to be prematurely terminated due to potential device overheating before the user actually desired to stop recording the stylized output video.

Turning now to FIG. 5E, which is the continuation of process 550 from FIG. 5D, it is shown that, when the process arrives at Step 572 (i.e., following a decision of 'N' at Step 558 of FIG. 5D), at least first and second parts of the selected first artistic style transfer network are applied to the first target image. Then, at Step 574, the outputs of the first and second parts of the selected first artistic style transfer network are combined to generate a stylized version of the first target image, before the process proceeds to Step 578. As mentioned above, Steps 564 and 566 from FIG. 5D proceed directly to Steps 578 and 576 of Figure 5E, respectively. Steps 574 and 576 also proceed to Step 578 after completion, meaning that all three 'branches' of process 550 (i.e., 1.) no change in capture mode or device performance parameters; 2.) change that can be accommodated via modification of the current DNN; and 3.) change that can be accommodated by selecting a different version of the current DNN) eventually convene at Step 578, once the appropriate version of the first artistic style transfer network has been applied to the first target image. At Step 578, the stylized images may optionally be scaled to whatever their desired final resolution or aspect ratio is for a given implementation. As mentioned above with respect to FIGS. 5A-5C, this process may also entail optionally blending the stylized images with higher resolution unstylized versions of the input image, e.g., to allow the user to control the 'look and feel' of the final stylized output image. Finally, at Step 580, the output stylized version of the first target image may be displayed and/or stored on the device. If there are more images to process with artistic style transfer (i.e., 'Y' at Step 582), the process 550 may return to Step 552 of FIG. 5D. If, instead, there are no more images to process with artistic style transfer (i.e., 'N' at Step 582), the process 550 may terminate.

Smoothly Varying Aspect Ratios for Real-Time Style Transfer

Figure 6:
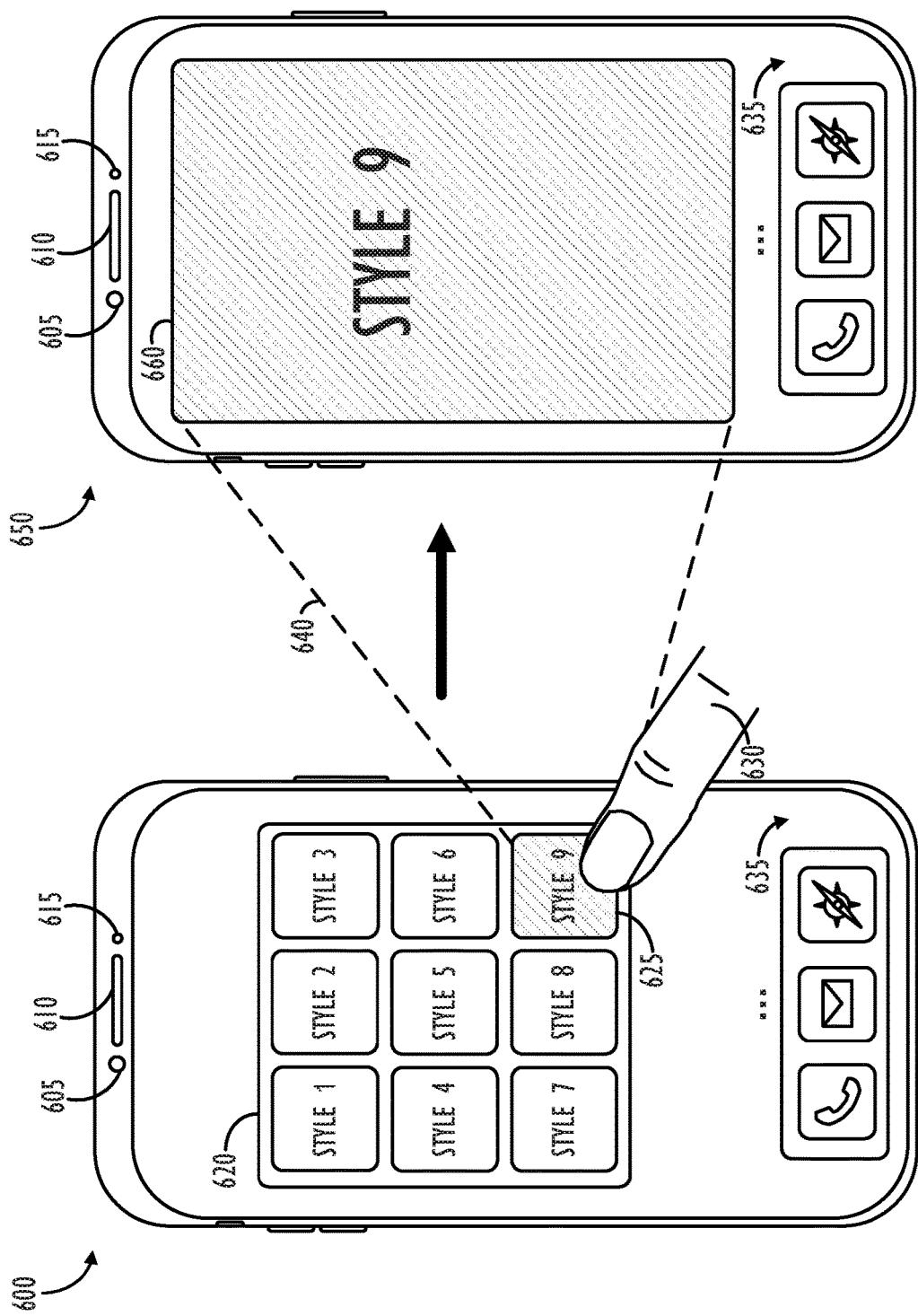
FIG. 6 illustrates an example of changing pixel aspect ratios in the application of real-time or near real-time artistic style transfer using DNNs, according to one or more embodiments.

Referring now to FIG. 6, an example of changing pixel aspect ratios in the application of real-time or near real-time artistic style transfer using DNNs is illustrated, according to one or more embodiments. Exemplary mobile processing device 600 may comprise a display screen (635) capable of displaying one or more graphical elements, such as graphical user interface (GUI) window 620. Device 600 may also possess various other sensors and/or hardware elements, such as one or more microphones, one or more speakers (610), one or more cameras (605) possessing image sensors, and one or more sources of invisible light (615), such as infrared (IR) or ultraviolet (UV) light. In the example of mobile processing device 600, GUI window 620 may display one or more artistic style transfer tiles (625), which may, e.g., provide a live, real-time preview of what each respective artistic style transfer will look like when applied to the incoming images captured by one or more cameras in communication with the device 600.

In some embodiments, the various artistic style transfer tiles (625) may be selectable by a user (630), thus causing the resolution and/or the aspect ratio of the stylized output images generated by the selected artistic style to be changed (640) in response to the selection by the user. For example, as illustrated on the display screen 635 of exemplary mobile processing device 650, selected artistic style "Style 9" has gone from being generated at a small square resolution, e.g., 180 pixels by 180 pixels, to a "full-screen" resolution (640), e.g., 1920 pixels by 1080 pixels. Information regarding the pixel aspect ratio (PAR) may be stored in the output stylized image's metadata so that various resolution and/or pixel aspect ratio changes may be applied to the image either in real-time or later, e.g., in post processing, or as the rendered stylized video is played back. As mentioned above, the higher resolution version of the "Style 9" output image may be created by switching to a different, i.e., higher resolution, version of the "Style 9" DNN set, or may be created (within operational limits of the device) by making one or more modifications to the currently selected DNN being used to apply "Style 9" to the incoming images.

In other embodiments, the transition from small, square output images to large, rectangular output images may be smoothed by rapidly transitioning between a plurality of networks in the set of DNNs for the selected artistic style. For example, a 180p version of the network may be used for 5 frames, followed by a 360p version of the network for 5 frames, followed by a 480p version of the network for 5 frames, followed by a 640p version of the network for 5 frames, followed by a 720p version of the network for 5 frames, followed by a 1080p version of the network for 5 frames. Thus, over the course of 30 captured frames (which may, in some embodiments, correspond to the elapsing of one second), the artistic style transfer network may have gracefully transitioned from 180p output to 1080p output, without any jarring transitions, without the need to tear down and recompile individually networks on the fly, and without any dropped frames in the process.

In still other embodiments, the full resolution version of the selected DNN may be brought up and running immediately upon selection by the user, and then, may be interpolated with the small square resolution version over time, e.g., as it gradually increases in size over some interval of time to the desired full screen resolution. In this way, the system is merely modifying the reshaping of the network output, rather than rapidly switching between a plurality of differently-sized networks in sequence.

Figure 7A:
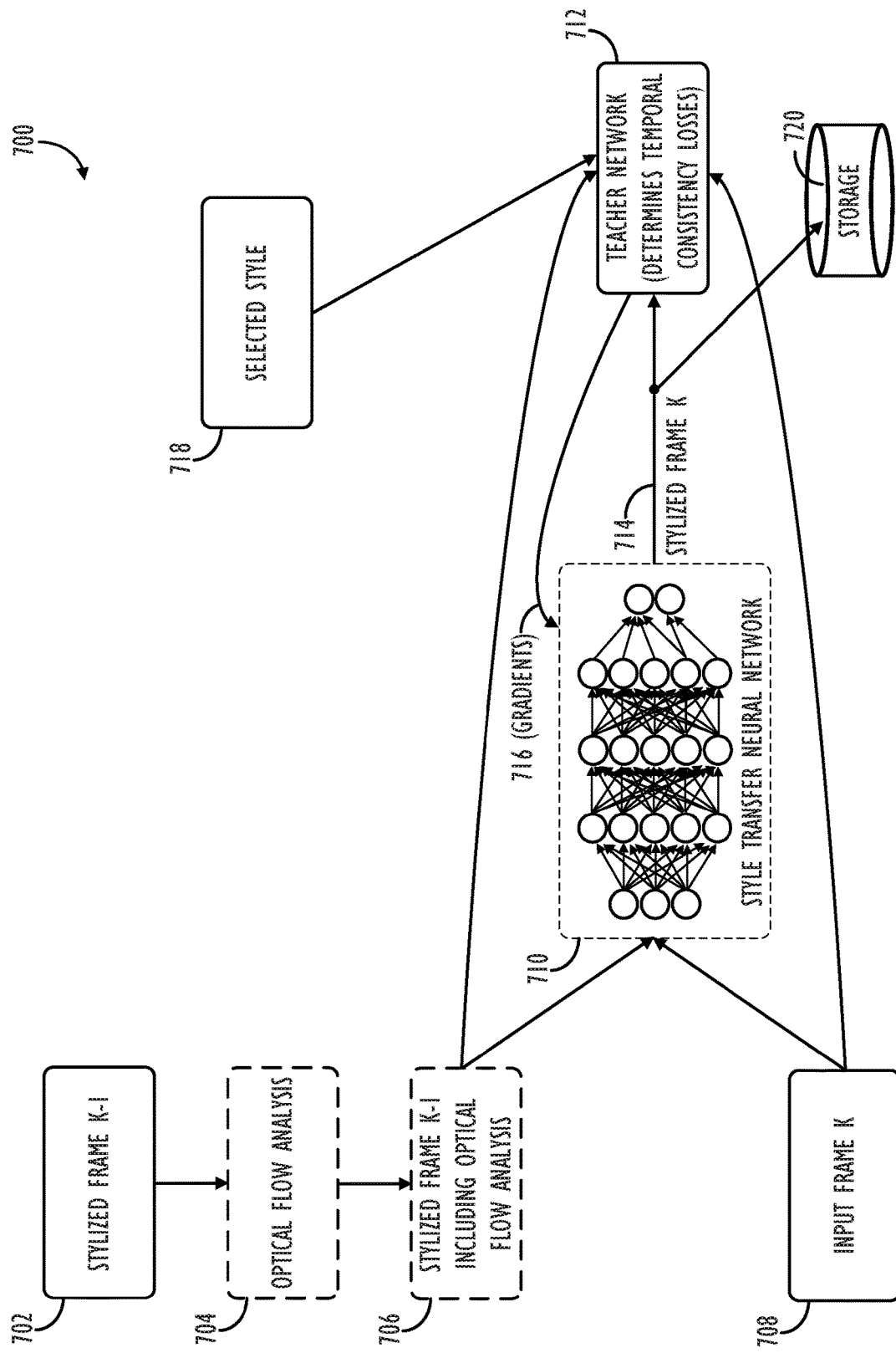
FIG. 7A illustrates an example of a trainable neural network for the application of an artistic style to captured video images, according to one or more embodiments.

Real-Time Adjustment of Temporal Consistency Constraints for Video Style Transfer Networks Referring now to FIG. 7A, an example of a trainable neural network 700 for the application of an artistic style to captured video images is illustrated, according to one or more embodiments. As illustrated in FIG. 7A, the style transfer neural network 710 may take two different images as its input, rather than just the single current input image, as discussed above with the networks of FIGS. 5A-5C.

In particular, the style transfer neural network 710 may operate upon both the current input image frame, i.e., "INPUT FRAME K" (708), as well as the stylized version of a previously captured (e.g., the immediately previously captured) input image frame, i.e., "STYLIZED FRAME K−1" (702). According to some embodiments, the stylized version of the previous input image frame (702) may also be subjected to an optical flow analysis (704), thereby generating a stylized version of the previous input image frame that includes optical flow analysis data (706).

The optical flow analysis information may be used by the network to characterize the amount and/or direction of movement of one or more scene objects in three-dimensional space, relative to the captured scene, i.e., in the time between the capture of the stylized version of the previous input image frame (702) and the capture of the current input image frame (708). The optical flow analysis data may then be used to guide the network as to the best position for placement of one or more objects in the scene during the application of the stylization process. By leveraging knowledge of the optical flow between the consecutive images, the network may attempt to ensure that there is not an unacceptable amount of "jumping" or "flickering" of objects in the scene between consecutive frames in the resulting stylized video sequence. By utilizing the optical flow data, the network can also define how much change (e.g., object displacement) is acceptable from frame to frame.

According to some embodiments of optical flow analysis, more than just a previous captured frame may be considered. For example, it would be possible to look at the previous two frames, or previous three frames, etc., and then use a blend of the previous two frames, or previous three frames, etc., as the input to the optical flow analysis. In still other embodiments, assuming that images subsequent to the image currently being stylized have already been captured by the device doing the processing, these so-called "future" frames could also be blended together with one or more of the previous frames when enforcing the temporal consistency constraints on the current frame (as future frames, much like previous frames, are likely to also have some knowledge about where a particular object should be located in the stylized version of the current frame).

As will be discussed in further detail below, additional runtime tuning may be performed on the stylized version of the previous input image frame including optical flow analysis data (706) in order to adjust the amount of temporal consistency enforced by the network (i.e., the degree to which objects are allowed to "jump" or "flicker" between consecutive frames). Once created, the input filter values for images 706 and 708 ("filter values," in this context, refers to whatever values are used to represent the data that will be processed by the neural network, e.g., in some embodiments, the filter values for the input images may simply be the three RGB color channel values for each of the pixels of the input images) may be concatenated and then run through the style transfer neural network 710 to generate a stylized version of the current input image frame, i.e., "STYLIZED FRAME K" (714). As may now be appreciated, "STYLIZED FRAME K" (714) will be calculated more efficiently and present a smoother transition from the previous frame in the resultant assembled stylized video sequence because the network was informed by the stylized version of the previously captured image frame (706) as it applied the style to the current frame (708). The "STYLIZED FRAME K" (714) may then be stored in temporary or permanent storage (720) and/or displayed, based on the desires of a given implementation.

Concurrently, the "STYLIZED FRAME K" (714) may be returned to a teacher network (712). Teacher network (712), which is used to train and improve the performance of the style transfer of style 718, e.g., by returning updated gradients (716), may be much larger and have many more layers than the neural network 710, which may be the actual network that is running on an individual's personal electronic device to perform artistic style transfer in real-time. Gradients 716 may, e.g., represent a detailed measurement of errors that network 710 made while generating "STYLIZED FRAME K" (714). Teacher network (712) may analyze the stylized frame produced by network 710 and, using all the information that it's given, predicts how far from a "perfect" version of frame K the current output is. The difference between the generated "STYLIZED FRAME K" (714) and its theoretical "perfect" version may then be used to estimate errors that the network 710 made while generating its stylized output for frame K. These errors/gradients may then be returned back to network 710 and can be used to update its internal parameters so that it produces better results the next time it is run.

Figure 7B:
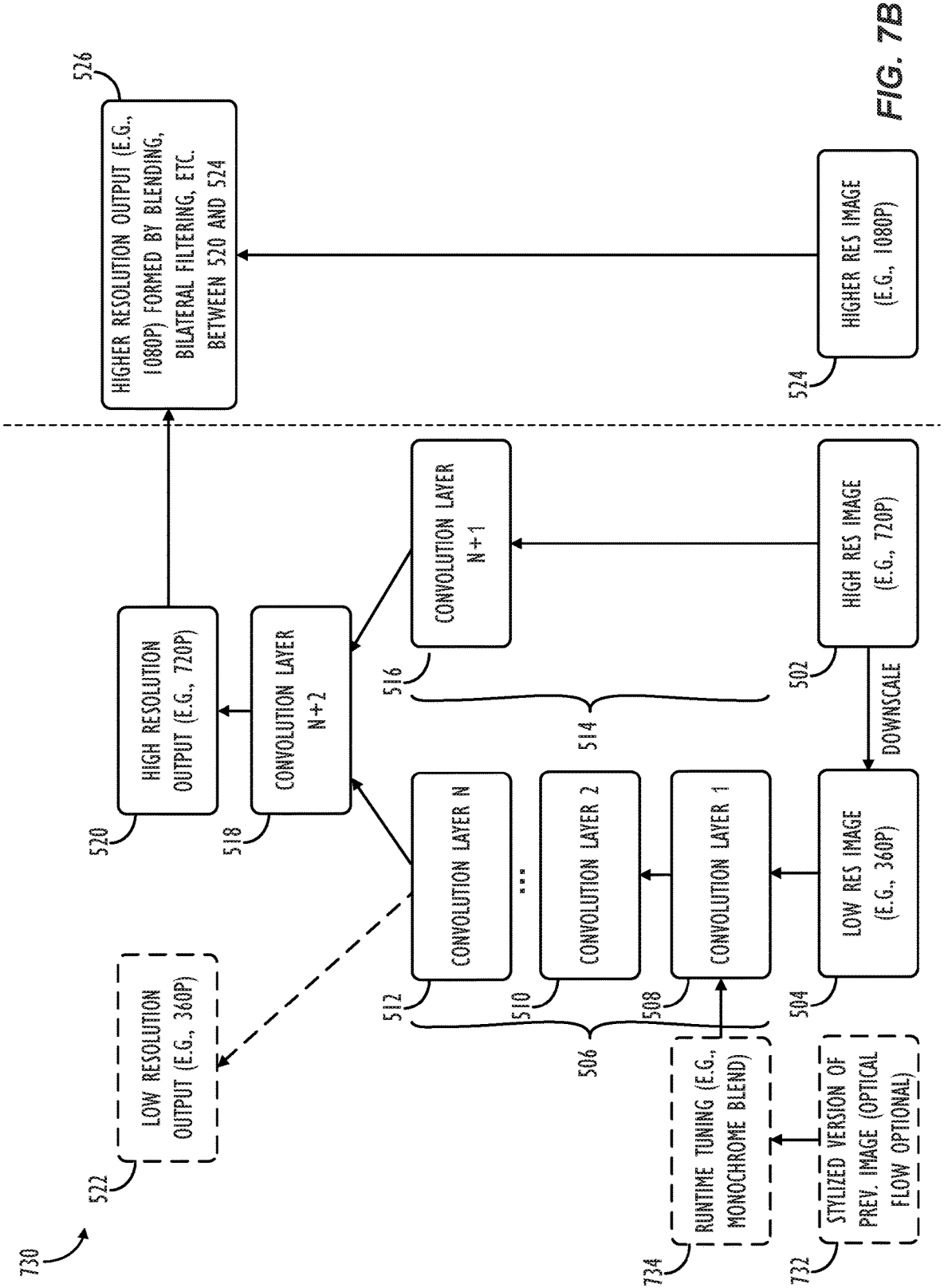
FIG. 7B illustrates an example of a dynamically adjustable neural network for the application of an artistic style to captured video images, according to one or more embodiments.

Referring now to FIG. 7B, an example of a dynamically adjustable neural network 730 for the application of an artistic style to captured video images is illustrated, according to one or more embodiments. Network 730 is similar to the networks described above with reference to FIGS. 5A-5C, with the exception of blocks 732 and 734 being added to the lower resolution part of the network (506). As described above with reference to FIG. 7A, the style transfer networks described herein may be modified for video style transfer to take an additional input of the stylized version of the previous image (732). In some embodiments, an optical flow analysis may also be performed upon the stylized version of the previous image (732), e.g., so that the network has knowledge of how the objects in the scene have moved relative to each other between the captures of the previous frame and the current frame. By applying the optical flow information, the network can reduce the amount of unwanted flicker and/or rapid frame-to-frame changes in the resultant assembled stylized video sequence.

In some embodiments, additional runtime tuning (734) may also be applied to the stylized version of the previous image (732) before it is concatenated with the low resolution version of the current input image (504) and passed into the first layer of the network (508). In particular, the additional runtime tuning (734) may be used to adjust how strongly the positions of objects in the current frame are constrained by their positions in the previous frame. In one extreme scenario of enforcing maximum temporal consistency, the network will attempt to minimize all cross-correlated feature differences between the previous image frame and the current image frame, thus resulting in the smoothest possible output video. In the other extreme scenario of enforcing no temporal consistency at all, the application of the style to the features in the current frame will not be influenced or informed (i.e., constrained) at all by the position of features in the stylized version of the previous frame, thus potentially resulting in large amounts of flickering from frame to frame in the resultant assembled stylized video sequence.

In one embodiment, the runtime tuning of temporal consistency may be achieved by training the network to handle a certain type of input image "independently" from the other images in the sequence. For example, the network may be trained to simulate the frame prior to the first captured frame (i.e., a hypothetical t=0 frame, which does not actually exist) by using a monochrome, e.g., all black, image as the frame previous to the first captured frame. The network may then be trained to process the monochrome, e.g., black, image independently, i.e., with no temporal constraints based on other images in the sequence. Because the network has been trained in such a fashion, the aforementioned temporal consistency tuning may be applied at runtime simply by modifying the previous stylized image to be "more black" (thereby decreasing the temporal constraint on the current image) or "less black" (thereby increasing the temporal constraint on the current image), without having to actually change the network's architecture or use a different network.

For example, if, during the real-time stylization of video frames, a user believes that the network is producing output that is too constrained by the features of the previous frames (i.e., not allowing enough movement of features from frame to frame) the user would be able to, at run time, adjust a slider (or other user interface element) to increase or decrease the temporal consistency constraint as desired. For example, by blending the previous stylized input image frame 50% with a monochrome black image, the network will essentially be half as constrained by the previous frame (since it has been trained to ignore black images). Likewise, by blending the previous stylized input image frame 90% with a monochrome black image, the network will be almost entirely not constrained by the previous frame. Of course, by returning the slider a position where it is blending the previous stylized input image frame 0% with a monochrome black image, the network would be back to applying the full amount of temporal consistency constraint from frame to frame. As may be understood, the level of temporal consistency desired by a user may change from style to style and/or from moment to moment in a captured video sequence.

In other embodiments, it may be desired to enforce different levels of temporal consistency in different areas of an image. For example, the monochrome black image example discussed above could be modified so that the input image is not blended with a black image uniformly, but, rather, with various strengths, depending on what is in the image. For example, if there is a dog (or other object of interest) in the middle of the frame K−1, it may be desirable to enforce less temporal consistency on the dog region of the image than the rest of the image, allowing the dog region of the image to change at will from stylized frame to stylized frame. To implement this, an image temporal consistency mask could be created with values ranging from 0.0 to 1.0 for each pixel in the image, e.g., with values of 0.0 in the dog region and values of 1.0 (or something close to 1.0, depending on desired strength of the temporal consistency) everywhere else in the image.

For example, in implementations where the entire input image is blended with a monochrome black image, the pixel values [x,y] in the resulting image, R, may be represented as:

$$R[x,y]=(1-T)*<\text{black image}>[x,y]+T*<\text{frame } K-1>[x,y] \quad \text{(Eqn. 1)},$$

wherein T is a blending value between 0.0 and 1.0 that is applied to the previous stylized frame, <frame K−1>, the compliment of which (i.e., 1−T) is applied to the monochrome black image, <black image>.

For implementations where a mask is used to blend different regions of the input image to different degrees with a monochrome black image, the pixel values in the resulting image may be represented as:

$$R[x,y]=(1-M[x,y])*<\text{black image}>[x,y]+M[x,y]*<\text{frame } K-1>[x,y] \quad \text{(Eqn. 2)},$$

wherein M has the same size as input frame K−1 and represents the values of the temporal consistency mask described above. Eqn. 2 thus provides for per-pixel control of the temporal consistency enforcement between frames.

The mask could also be adjusted in a dynamic fashion, depending on what content is where in the image frame (and at what times). For example, some embodiments may even be able to define different temporal consistency levels for different object types in a captured image, e.g., dogs, trees, cars, human faces, sky, etc.

Figure 7C:
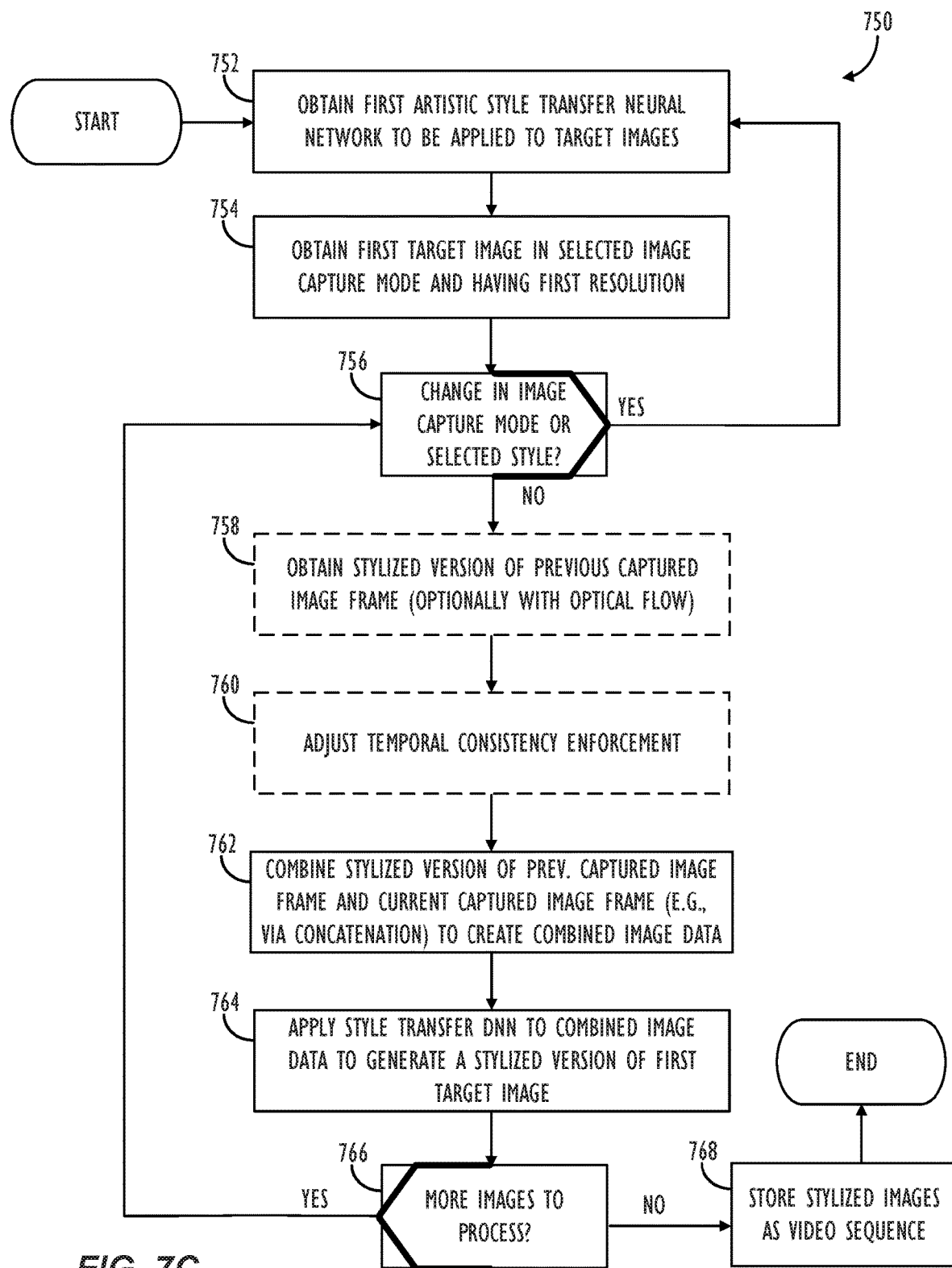
FIG. 7C is a flowchart illustrating a technique for generating a stylized video sequence using a dynamically adjustable style transfer DNN with temporal consistency constraints, according to one or more embodiments.

Referring now to FIG. 7C, a flowchart 750 illustrating a technique for generating a stylized video sequence using a dynamically adjustable style transfer DNN with temporal consistency constraints is shown, according to one or more embodiments. First, at Step 752, the device executing the process 750 may obtain a particular first artistic style transfer that is to be applied to the input images, e.g., wherein the first artistic style is stored as a plurality of layers in a selected first neural network, and wherein the selected first neural network is configured to operate on multiple input images at a time. Next, at Step 754, the device may obtain a first target image in a selected image capture mode having a first resolution, and at a first time. The capture mode may, e.g., comprise a "preview" mode, in which the images frames captured by the image sensor are streamed to a display on the image capture device, but are not written to long term memory storage. Alternately, the capture mode may comprise a video "record" mode, in which the image frames captured by the image sensor are streamed to a display on the image capture device, as well as being written to long term memory storage.

In other embodiments, the user of the device may periodically (or continuously) be given the option to switch the first artistic style being applied to the captured target images to a different style, e.g., a style based on a different artwork source image, or a different photographic image. In still other embodiments, the device may display more than one artistic style transferred version of the target images at a time (e.g., in lower resolutions and/or in a tiled array on the display of the device), unless or until a user selects one particular artistic style to be applied to the target images, at which point the selected artistic style may be applied at a higher resolution and/or frame rate that the multiple stylized tiled images were being display at.

At Step 756, the process will periodically (or instantaneously) check to determine whether there have been any relevant changes in the image capture mode and/or the selected first artistic style, e.g., changes that would affect the resolution, aspect ratio, or frame rate, etc. of the incoming captured images. If there has been a relevant change (i.e., 'Y' at Step 756), the process may return to Step 752 to update the selected artistic style, if necessary, and to Step 754 to continue capturing images in the new mode.

If, instead, there have not been any relevant changes (i.e., 'N' at Step 756), the process may proceed to Step 758, wherein the stylized version of the previously captured image frame may optionally be obtained. As described above, an optical flow (or other motion analysis) may also optionally be performed, e.g., to determine the relative motion between the stylized version of the previously captured image frame and the currently captured image frame. Next, at Step 760, the user may be presented with an option to adjust or tune the temporal consistency enforcement applied by the network (e.g., in real time) between consecutive frames in the video sequence of target images being obtained by the device. As described above, in one embodiment, this may be achieved by training the network to ignore (from a temporal constraint standpoint) image content data having a certain hue, certain patterns, certain intensity, or certain color composition (e.g., a monochrome black image), and then blending the stylized version of the previously captured image frame with the type of image content data that the network has been trained to ignore. Thus, the more the blended version of the stylized version of the previously captured image frame resembles the image content that the network has been trained to ignore, the less the network will enforce any kind of temporal consistency between the previously captured frame and the current frame in the resultant assembled stylized video sequence.

Next, at Step 762, the image filters representing the content of the stylized version of the previous obtained target image (optionally tuned, as it might be, to increase or decrease the enforcement of the temporal consistency) and the image filters representing the current unstylized version of the first target image may be combined together (e.g., via concatenation or other combination methods, such that the first artistic style transfer network may be applied to the combined image data). In other embodiments, the first target image may be combined with one or more additional target images (such as images in addition to, or in place of, the previous obtained image), e.g., other target images obtained at times other than the first time. Finally, the first artistic style transfer network may be applied to the combined image data (e.g., the aforementioned set of concatenated filters) to generate a stylized version of the first target image (Step 764). According to some embodiments, applying the first artistic style transfer network may comprise applying at least a first part of the first artistic style transfer network to the first target image to generate the stylized version of the first target image. The stylized version may then be stored and/or displayed on a device display screen, as is desired by a given implementation. As discussed above with reference to FIG. 7B, in some embodiments, this newly-concatenated image data will only be fed into a low-resolution part of the network architecture (e.g., 506).

If there are more images being captured to process with the style transfer network (i.e., 'Y' at Step 766), the process may return to Step 756 to again execute the process of applying the selected artistic style network to the subsequently obtained target images (i.e., Steps 758-764). If there are no more images left to process and/or the user has indicated a desire to end to the style transfer process (i.e., 'N' at Step 766), the process may store the stylized versions of the obtained target images in a memory together as a stylized video sequence (Step 768). Finally, the process 750 may end.

Architectural Fusion Techniques for Deep Neural Networks

Complex networks like style transfer have many layer types other than convolution layers. Image to image networks are usually characterized by small filter size and large image size, thereby increasing their requirements, in terms of memory bandwidth, for layer intermediate data. To reduce bandwidth usage, and hence both power and time, various fusions of operations may be performed on the network data.

Figure 8:
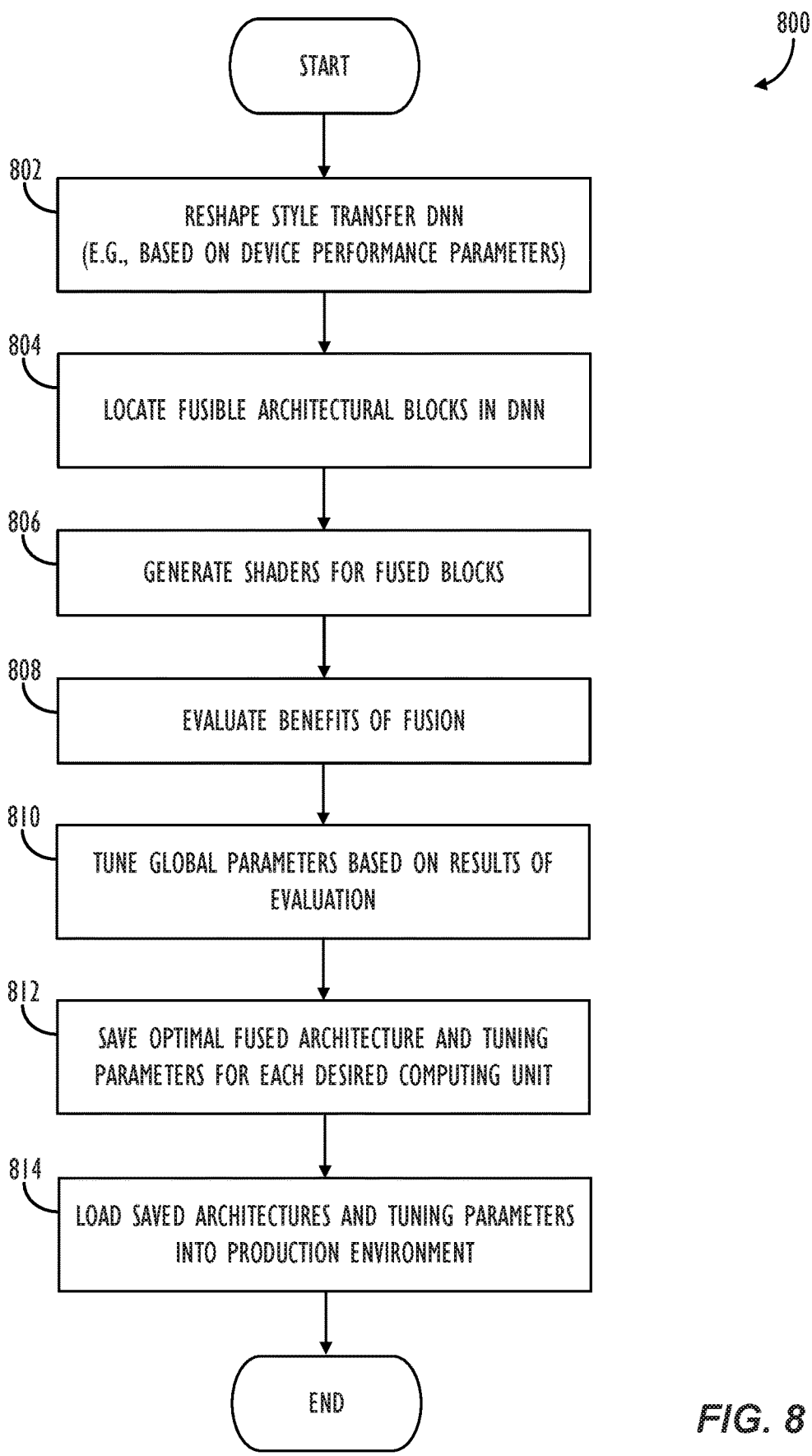
FIG. 8 is a flowchart illustrating a technique for performing optimized architectural fusion on neural networks, according to one or more embodiments.

Referring now to FIG. 8, a flowchart 800 illustrating a technique for performing optimized architectural fusion on neural networks is shown, according to one or more embodiments. First, at Step 802, a network reshaping (i.e., modification process) may be performed, e.g., resolution reshaping, layer reshaping, etc., as described above with respect to FIGS. 5A-5C. As mentioned above, the reshaping of the network may also be based on, e.g., the device's performance parameters. Next, at Step 804, fusible architectural features may be identified and located within the neural network. According to some embodiments, locating fusible features may comprise identifying patterns of elements in the network that have known fusion optimizations. Examples of patterns that have known fusion optimizations that may be generated for style transfer networks include: classic/trivial vertical fusions (e.g., convolution+bias+non-linearities; reflective padding, concatenation); the Winograd transform; convolutions of Winograd transforms fused with up-sampling; a convolution fused with an instance normalization; a convolution fused with a concatenation; instance normalization statistics computations; and instance normalization scaling. By reducing the number of layers in the neural network, e.g., via the aforementioned fusion optimizations, performance may be greatly improved at the run time application of the network (also referred to as the "inferencing" the network), e.g., on one or more GPUs.

Next, at Step 806, a shader (e.g., GPU program) involving the fused architectural block(s) may be generated (i.e., as opposed to using pre-compiled shader programs). At Step 808, time and/or power benchmarks may be taken in order to evaluate the benefit (or lack thereof) of the fusion. In some embodiments, these benchmarks may need to be taken for each combination of computing processing unit (e.g., CPU and/or GPU) that will be used to perform the artistic style transfer process. Based on these benchmarks, at Step 810, the process may re-tune the system's global parameters for network optimization, shader meta-parameters, and/or optimal parallel grid configurations (i.e., the 'wisdom' of the system may be updated based on the empirical data). The optimal fused network architectures and/or optimal tuning parameters for each combination of computing processing unit that will be used to perform the artistic style transfer process may then be saved (Step 812), and loaded into the production runtime environments of the various devices that will be used to perform the artistic style transfer process (Step 814), such that the appropriate optimizations and parameters may be selected by a device at runtime, given the current operating conditions and the respective device's current processing capabilities. In other embodiments, the style transfer process could be executed concurrently across multiple devices, as well, for which optimizations could also be identified and stored by process 800. In still other embodiments, rather than being optimized and tuned "offline," e.g., during a manufacturing stage and/or otherwise before the device is being used at runtime, the network fusion and optimization techniques described above could also alternatively be applied at runtime, i.e., the device can wait to determine the best optimizations and/or fusions for a given neural network until such time that the user of the device needs to apply the network on their device.

Exemplary Electronic Device

Figure 9:
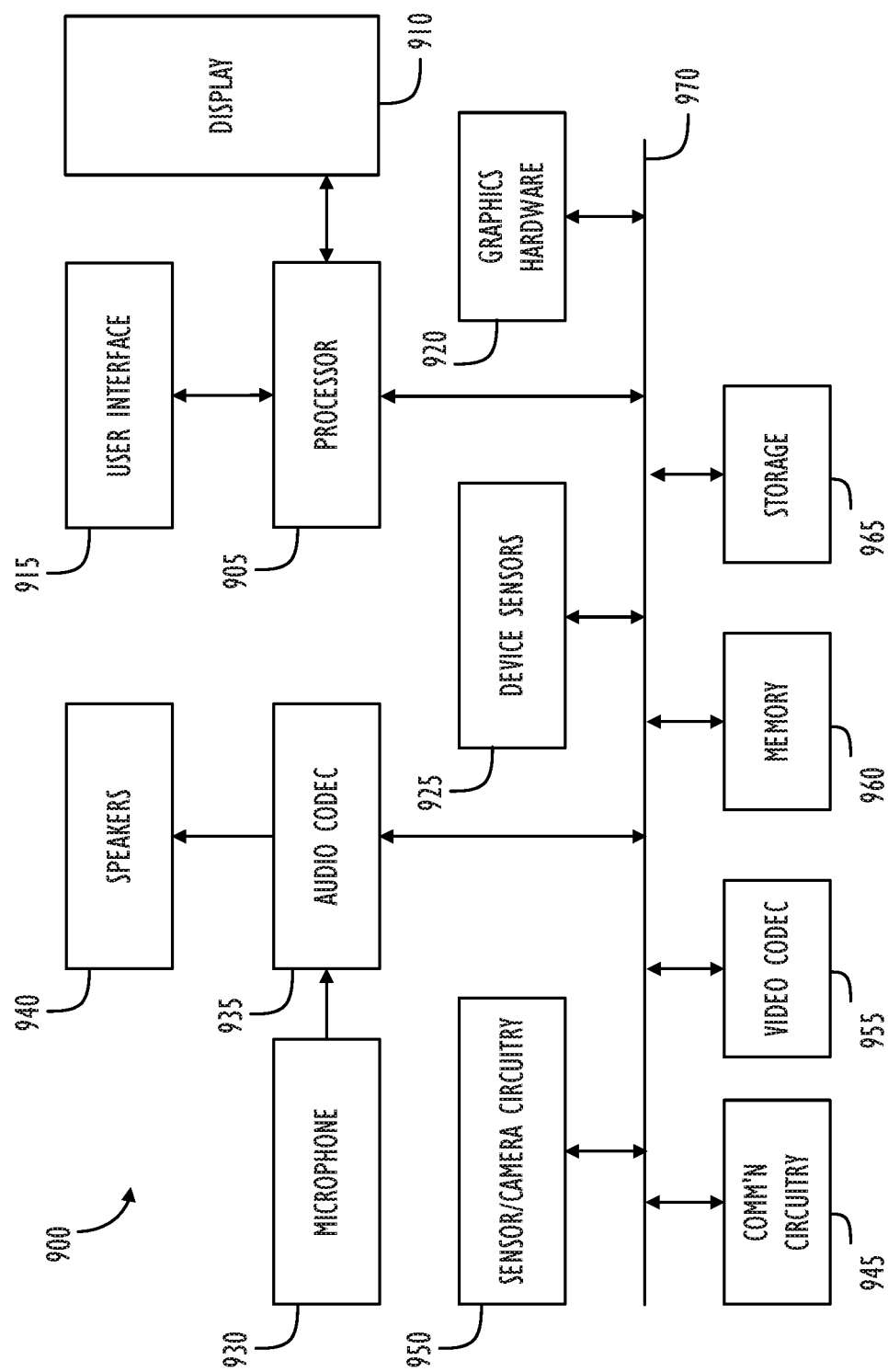
FIG. 9 is a block diagram illustrating a programmable electronic device, in which one or more of the techniques disclosed herein may be implemented.

Referring now to FIG. 9, a simplified functional block diagram of illustrative programmable electronic device 900 is shown according to one embodiment. Electronic device 900 could be, for example, a mobile telephone, personal media device, portable camera, or a tablet, notebook or desktop computer system. As shown, electronic device 900 may include processor 905, display 910, user interface 915, graphics hardware 920, device sensors 925 (e.g., proximity sensor/ambient light sensor, accelerometer and/or gyroscope), microphone 930, audio codec(s) 935, speaker(s) 940, communications circuitry 945, sensor/camera circuitry 950, which may, e.g., comprise multiple camera units/optical sensors having different characteristics (as well as camera units that are housed outside of, but in electronic communication with, device 900), video codec(s) 955, memory 960, storage 965, and communications bus 970.

Processor 905 may execute instructions necessary to carry out or control the operation of many functions performed by device 900 (e.g., such as the generation and/or processing of images in accordance with the various embodiments described herein). Processor 905 may, for instance, drive display 910 and receive user input from user interface 915. User interface 915 can take a variety of forms, such as a button, keypad, dial, a click wheel, keyboard, display screen and/or a touch screen. User interface 915 could, for example, be the conduit through which a user may view a captured video stream and/or indicate particular frame(s) that the user would like to have a particular stabilization constraint(s) applied to (e.g., by clicking on a physical or virtual button at the moment the desired frame is being displayed on the device's display screen).

In one embodiment, display 910 may display a video stream as it is captured while processor 905 and/or graphics hardware 920 and/or image capture circuitry contemporaneously generate a stylized version of the captured video stream, storing the video stream in memory 960 and/or storage 965. Processor 905 may be a system-on-chip such as those found in mobile devices and include one or more dedicated graphics processing units (GPUs). Processor 905 may be based on reduced instruction-set computer (RISC) or complex instruction-set computer (CISC) architectures or any other suitable architecture and may include one or more processing cores. Graphics hardware 920 may be special purpose computational hardware for processing graphics and/or assisting processor 905 perform computational tasks. In one embodiment, graphics hardware 920 may include one or more programmable graphics processing units (GPUs).

Sensor/camera circuitry 950 may comprise one or more camera units configured to capture images, e.g., images which may be processed to generate stylized versions of said captured images, e.g., in accordance with this disclosure.

Output from sensor/camera circuitry 950 may be processed, at least in part, by video codec(s) 955 and/or processor 905 and/or graphics hardware 920, and/or a dedicated image processing unit incorporated within sensor/camera circuitry 950. Images so captured may be stored in memory 960 and/or storage 965. Memory 960 may include one or more different types of media used by processor 905, graphics hardware 920, and sensor/camera circuitry 950 to perform device functions. For example, memory 960 may include memory cache, read-only memory (ROM), and/or random access memory (RAM). Storage 965 may store media (e.g., audio, image and video files), computer program instructions or software, preference information, device profile information, and any other suitable data. Storage 965 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 960 and storage 965 may be used to retain computer program instructions or code organized into one or more modules and written in any desired computer programming language. When executed by, for example, processor 905 such computer program code may implement one or more of the methods described herein.

It is to be understood that the above description is intended to be illustrative, and not restrictive. For example, the above-described embodiments may be used in combination with each other. Many other embodiments will be apparent to those of skill in the art upon reviewing the above description. For example, similar dynamic neural network adjustment techniques may also be applied in other applications wherein neural networks are used to process data on a device facing processing and/or thermal constraints, e.g., in the fields of face detection or object detection, or to solve problems in the areas of super resolution and/or image segmentation. The scope of the invention therefore should be determined with reference to the appended claims, along with the full scope of equivalents to which such claims are entitled.

What is claimed is:

1. An image processing method, comprising:
   obtaining a first artistic style, wherein the artistic style is stored as a plurality of layers in a selected first neural network, and wherein the selected first neural network is configured to operate on multiple input images at a time;
   obtaining a first target image captured at a first time;
   applying at least a first part of the selected first neural network to the first target image to create a stylized version of the first target image;
   obtaining a second target image captured at a second time that is later than the first time;
   combining the stylized version of the first target image and the second target image to generate a combined input image;
   applying at least the first part of the selected first neural network to the combined input image to create a stylized version of the second target image; and
   storing the stylized versions of the first and second target images in a memory as a stylized video sequence.

2. The method of claim 1, further comprising:
   applying a temporal consistency constraint to the application of the first neural network, wherein the temporal consistency constraint controls the degree to which the stylized version of the second target image is constrained by the stylized version of the first target image.

3. The method of claim 2, wherein:
   the temporal consistency constraint is adjustable in real-time.

4. The method of claim 1, wherein combining the stylized version of the first target image and the second target image to generate a combined input image further comprises:
   concatenating together filters that are representative of the stylized version of the first target image and filters that are representative of the second target image.

5. The method of claim 1, further comprising:
   applying an optical flow analysis to the stylized version of the first target image.

6. The method of claim 5, wherein applying at least the first part of the selected first neural network to the combined input image to create a stylized version of the second target image further comprises:
   utilizing the optical flow analysis.

7. The method of claim 1, wherein combining the stylized version of the first target image and the second target image to generate a combined input image further comprises:
   combining the stylized version of the first target image and the second target image with one or more additional target images obtained at times other than the first time or the second time, in order to generate a combined input image.

8. A non-transitory program storage device comprising instructions stored thereon to cause one or more processors to:
   obtain a first artistic style, wherein the artistic style is stored as a plurality of layers in a selected first neural network, and wherein the selected first neural network is configured to operate on multiple input images at a time;
   obtain a first target image captured at a first time;
   apply at least a first part of the selected first neural network to the first target image to create a stylized version of the first target image;
   obtain a second target image captured at a second time that is later than the first time;
   combine the stylized version of the first target image and the second target image to generate a combined input image;
   apply at least the first part of the selected first neural network to the combined input image to create a stylized version of the second target image; and
   store the stylized versions of the first and second target images in a memory as a stylized video sequence.

9. The non-transitory program storage device of claim 8, further comprising instructions stored thereon to cause one or more processors to:
   apply a temporal consistency constraint to the application of the first neural network, wherein the temporal consistency constraint controls the degree to which the stylized version of the second target image is constrained by the stylized version of the first target image.

10. The non-transitory program storage device of claim 9, wherein the temporal consistency constraint is adjustable in real-time.

11. The non-transitory program storage device of claim 8, wherein the instructions to cause the one or more processors to combine the stylized version of the first target image and the second target image to generate a combined input image further comprise instructions to cause the one or more processors to:

concatenate together filters that are representative of the stylized version of the first target image and filters that are representative of the second target image.

12. The non-transitory program storage device of claim 8, further comprising instructions stored thereon to cause one or more processors to:
apply an optical flow analysis to the stylized version of the first target image.

13. The non-transitory program storage device of claim 8, wherein the instructions to cause the one or more processors to combine the stylized version of the first target image and the second target image to generate a combined input image further comprise instructions to cause one or more processors to:
combine the stylized version of the first target image and the second target image with one or more additional target images obtained at times other than the first time or the second time, in order to generate a combined input image.

14. A device, comprising:
an image sensor;
a display screen;
a memory communicatively coupled to the image sensor;
one or more processors operatively coupled to the image sensor and the memory configured to execute instructions causing the one or more processors to:
obtain a first artistic style, wherein the artistic style is stored as a plurality of layers in a selected first neural network, and wherein the selected first neural network is configured to operate on multiple input images at a time;
obtain a first target image captured at a first time;
apply at least a first part of the selected first neural network to the first target image to create a stylized version of the first target image;
obtain a second target image captured at a second time that is later than the first time;
combine the stylized version of the first target image and the second target image to generate a combined input image;
apply at least the first part of the selected first neural network to the combined input image to create a stylized version of the second target image; and
store the stylized versions of the first and second target images in a memory as a stylized video sequence.

15. The device of claim 14, wherein the one or more processors are further configured to execute instructions causing the one or more processors to:
apply a temporal consistency constraint to the application of the first neural network, wherein the temporal consistency constraint controls the degree to which the stylized version of the second target image is constrained by the stylized version of the first target image.

16. The device of claim 15, wherein the temporal consistency constraint is adjustable in real-time.

17. The device of claim 14, wherein the instructions causing the one or more processors to combine the stylized version of the first target image and the second target image to generate a combined input image further comprise instructions causing the one or more processors to:
concatenate together filters that are representative of the stylized version of the first target image and filters that are representative of the second target image.

18. The device of claim 14, wherein the one or more processors are further configured to execute instructions causing the one or more processors to:
apply an optical flow analysis to the stylized version of the first target image.

19. The device of claim 18, wherein the instructions causing the one or more processors to apply at least the first part of the selected first neural network to the combined input image to create a stylized version of the second target image further comprise instructions causing the one or more processors to:
utilize the optical flow analysis.

20. The device of claim 14, wherein the instructions causing the one or more processors to combine the stylized version of the first target image and the second target image to generate a combined input image further comprise instructions causing one or more processors to:
combine the stylized version of the first target image and the second target image with one or more additional target images obtained at times other than the first time or the second time, in order to generate a combined input image.

\* \* \* \* \*